(12) United States Patent
Mohanty et al.

(10) Patent No.: US 11,440,089 B2
(45) Date of Patent: Sep. 13, 2022

(54) REFRACTORY LINING STRUCTURE

(71) Applicant: VESUVIUS USA CORPORATION, Champaign, IL (US)

(72) Inventors: Beda Mohanty, Perrysburg, OH (US); Daniel T. Schaner, Medina, OH (US); Robert L. Richardson, Jr., Middletown, OH (US)

(73) Assignee: VESUVIUS USA CORPORATION, Champaign, IL (US)

( * ) Notice: Subject to any disclaimer, the term of this patent is extended or adjusted under 35 U.S.C. 154(b) by 0 days.

(21) Appl. No.: 16/631,669

(22) PCT Filed: Aug. 21, 2018

(86) PCT No.: PCT/US2018/047253
§ 371 (c)(1),
(2) Date: Jan. 16, 2020

(87) PCT Pub. No.: WO2019/046042
PCT Pub. Date: Mar. 7, 2019

(65) Prior Publication Data
US 2020/0198003 A1    Jun. 25, 2020

Related U.S. Application Data

(60) Provisional application No. 62/551,509, filed on Aug. 29, 2017.

(51) Int. Cl.
*B22D 41/02*    (2006.01)
*B22D 41/00*    (2006.01)
(Continued)

(52) U.S. Cl.
CPC ........... *B22D 41/02* (2013.01); *B22D 41/003* (2013.01); *B22D 11/10* (2013.01); *B22D 41/08* (2013.01);
(Continued)

(58) Field of Classification Search
CPC ...... B22D 41/02; B22D 41/003; B22D 11/10; B22D 41/08; C04B 35/66; C04B 2235/9676
See application file for complete search history.

(56) References Cited

U.S. PATENT DOCUMENTS 4,126,301 A    11/1978    Massin
4,194,730 A    3/1980    Matsumoto et al.
(Continued)

FOREIGN PATENT DOCUMENTS

CN    202791146 U    3/2013
CN    105917186 A    8/2016
(Continued)

*Primary Examiner* — Scott R Kastler
(74) *Attorney, Agent, or Firm* — Blue Filament Law PLLC

(57) ABSTRACT

A refractory lining structure for a metallurgical vessel is characterized by at least one elongated expansion joint formed in and extending through the surface of the working lining in a substantially vertical direction. The elongated expansion joint accommodates thermal expansion of the working lining in a metallurgical vessel such as, for example, a tundish during preheating for a continuous casting operation. The elongated expansion joint decreases crack formation, delamination, and spalling of the working lining from underlying back-up linings and/or safety linings in metallurgical vessels during preheating and use, while still facilitating metal skull removal after the completion of metallurgical operations.

19 Claims, 16 Drawing Sheets

(51) Int. Cl.
 *B22D 11/10* (2006.01)
 *B22D 41/08* (2006.01)
 *C04B 35/66* (2006.01)
(52) U.S. Cl.
 CPC ...... *C04B 35/66* (2013.01); *C04B 2235/9676* (2013.01)

(56) References Cited

U.S. PATENT DOCUMENTS

| | | |
|---|---|---|
| 4,196,159 A | 4/1980 | Brotzmann et al. |
| 4,339,115 A * | 7/1982 | Daussan ................ B22D 41/02 266/280 |
| 4,441,700 A * | 4/1984 | LaBate .................... C21B 7/14 266/196 |
| 5,139,239 A | 8/1992 | Eccleston |
| 5,284,808 A * | 2/1994 | Damiano ................ C04B 35/66 501/103 |
| 2004/0157725 A1 | 8/2004 | Doza et al. |
| 2016/0304403 A1* | 10/2016 | Klischat ................ C04B 35/443 |

FOREIGN PATENT DOCUMENTS

| | | |
|---|---|---|
| CN | 209754004 U | 12/2019 |
| EP | 2206997 A1 | 7/2010 |
| GB | 1298079 | 8/1992 |

\* cited by examiner

REFRACTORY LINING STRUCTURE

CROSS-REFERENCE TO RELATED APPLICATIONS

This application is a U.S. national stage application, filed under 35 U.S.C. § 371, of International Application No. PCT/US2018/047253, which was filed on Aug. 21, 2018, and which claims priority to U.S. application Ser. No. 62/551,509, filed Aug. 29, 2017, the contents of each of which are incorporated by reference in this specification.

BACKGROUND OF THE INVENTION

(1) Field of the Invention

The present application generally relates to refractory lining structures used in metallurgical vessels.

(2) Description of the Related Art

The information described in this background section is not admitted to be prior art.

In metallurgical processes, such as casting, molten metal is transported between unit operations in metallurgical vessels. For example, in continuous casting processes, molten steel is tapped from a steelmaking furnace into a ladle. The ladle functions as a transporting vessel within which the molten steel moves from the steelmaking furnace to a casting platform. At the casting platform, the molten steel transfers from the ladle to a tundish. The tundish functions as a metering device that distributes the molten steel through one or more nozzles into molds in a continuous flow.

Metallurgical vessels, such as, for example, ladles and tundishes, must physically contain molten metal at relatively high temperatures, for example, in steelmaking processes, at temperatures greater than 1400° C. (2552° F.). Additionally, the molten metal-contacting surfaces of metallurgical vessels should be as chemically inert as possible with respect to the molten metal contained within the vessels. Accordingly, metallurgical vessels are lined with refractory materials to provide physically-stable and chemically-stable molten metal-contacting surfaces and insulation between the molten metal and the vessel shells, which are typically made of solid steel and therefore susceptible to overheating and loss of mechanical integrity if contacted by molten metal.

A variety of refractory products have been developed for metallurgical vessel linings. Nevertheless, enhanced refractory lining structures for metallurgical vessels, which provide improved mechanical stability and structural integrity during use, would be advantageous.

BRIEF SUMMARY OF THE INVENTION

The invention described in this specification is directed to refractory lining structures for metallurgical vessels. The invention described in this specification is also directed to metallurgical vessels comprising the refractory lining structures, methods for making the refractory lining structures and for making metallurgical vessels comprising the refractory lining structures, and methods of using metallurgical vessels comprising the refractory lining structures in metallurgical processes. The refractory lining structures provide improved mechanical stability and structural integrity, characterized by, for example, decreased cracking, delamination, and spalling of working linings from underlying back-up linings in metallurgical vessels during preheating and use, while still facilitating metal skull removal after the completion of metallurgical operations.

A refractory lining structure for a metallurgical vessel comprises a first layer and a second layer underlying at least a portion of the first layer. The first layer and the second layer both have a first surface facing away from a sidewall of a metallurgical vessel and a second surface located opposite the first surface and facing toward the sidewall of the metallurgical vessel. The second surface of the first layer contacts the first surface of the second layer. The first layer comprises a first refractory material, and the second layer comprises a second refractory material. At least one elongated expansion joint is formed in the first surface of the first layer and extends through the first surface of the first layer in a substantially vertical direction.

BRIEF DESCRIPTION OF THE DRAWINGS

Various features and characteristics of the invention described in this specification may be more thoroughly understood by reference to the accompanying figures, in which:

FIGS. 1A-1D are schematic diagrams, not to scale, of a tundish comprising a refractory lining structure, wherein FIG. 1A is an isometric (top) view of the tundish; FIG. 1B is a cross-sectional, elevational (side) view of the tundish; FIG. 1C is another cross-sectional, (side) elevational view showing molten metal in the tundish; and FIG. 1D is a plan (top) view of the tundish;

FIGS. 15A and 15B are schematic diagrams, not to scale, of a tundish comprising a refractory lining structure comprising elongated expansion joints of different dimensions, wherein FIG. 15A is an isometric (top) view of the tundish; and FIG. 15B is a cross-sectional, elevational (side) view of the tundish.

Figure 1A:
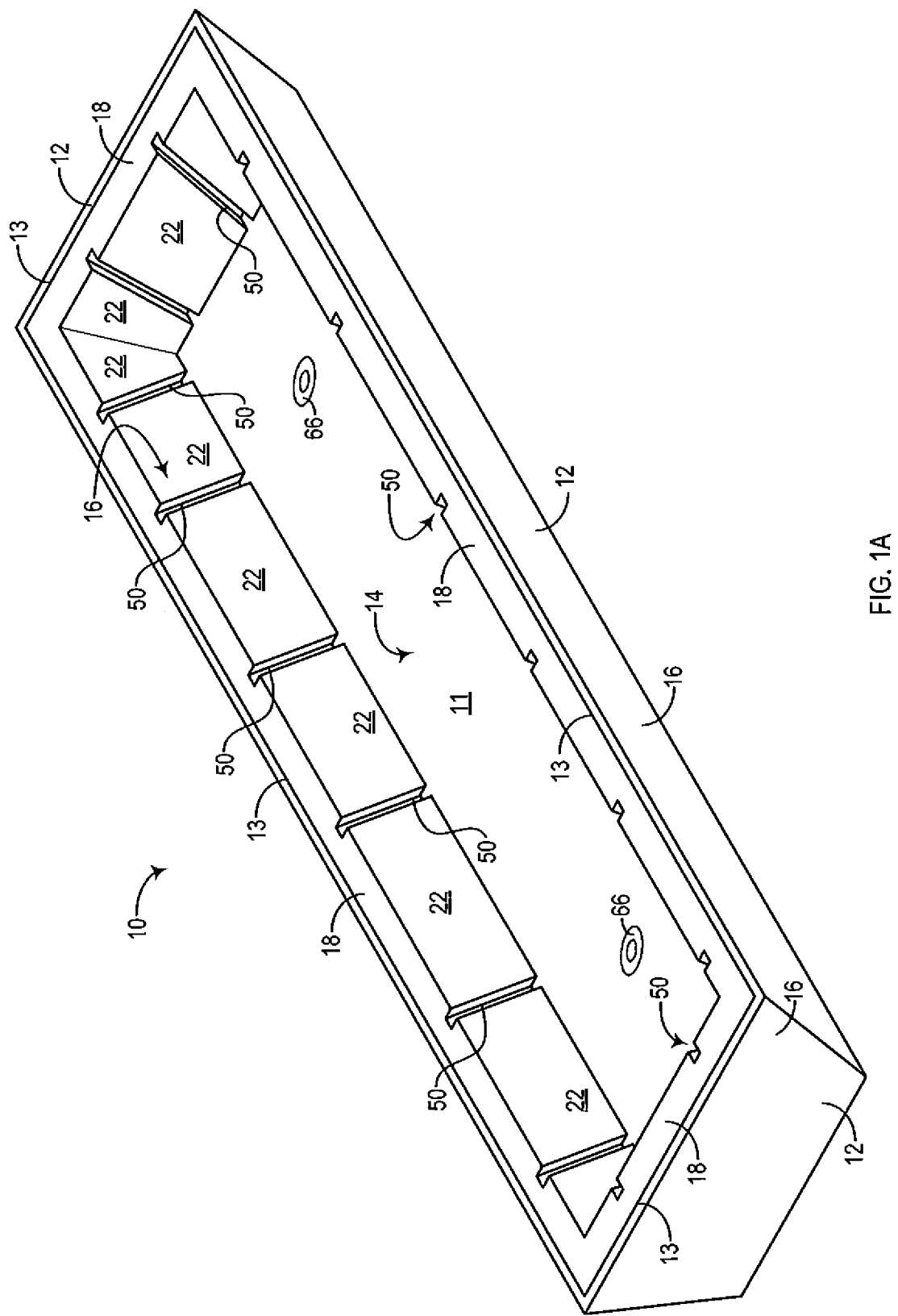
Figure 1B:
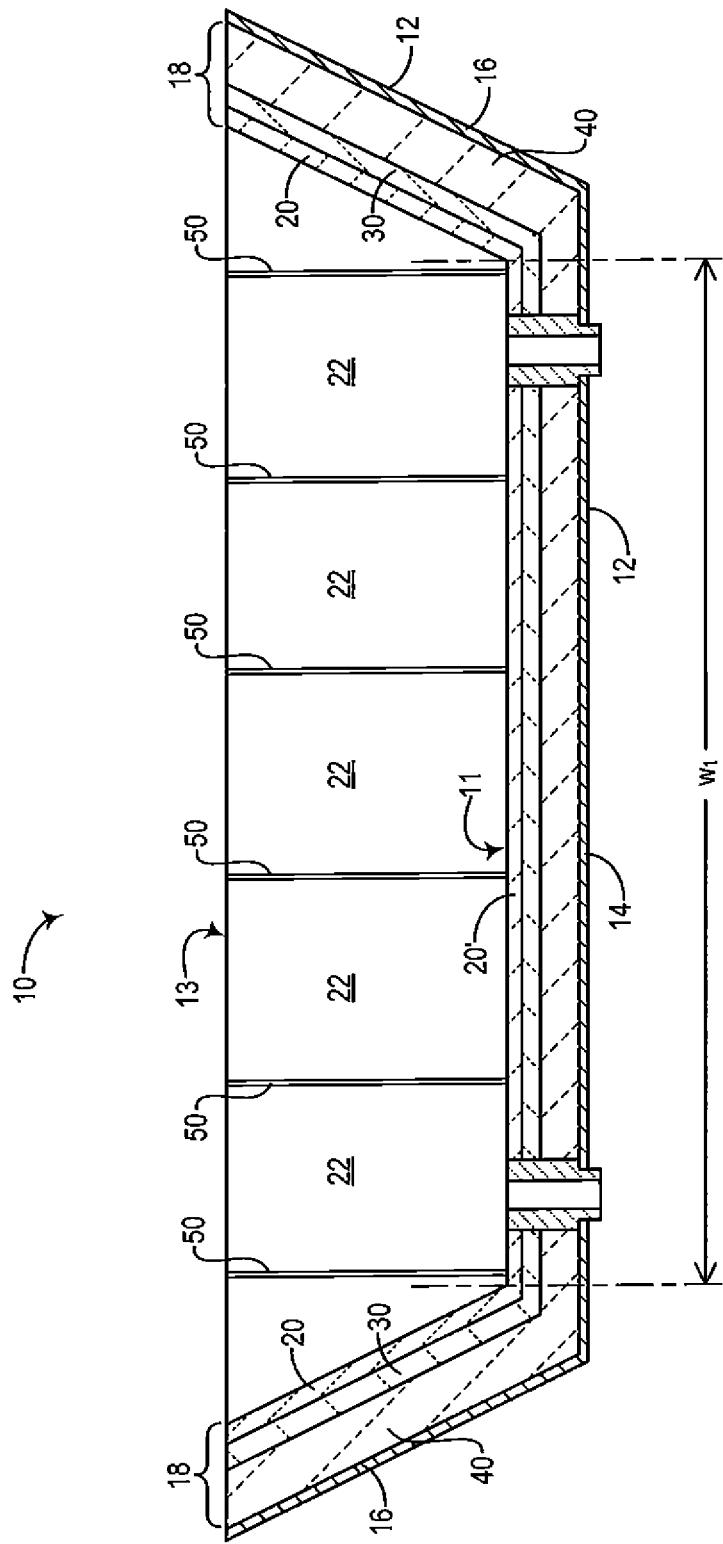

The reader will appreciate the foregoing features and characteristics, as well as others, upon considering the following detailed description of the invention.

DETAILED DESCRIPTION OF THE INVENTION

The invention described in this specification is directed to a refractory lining structure for metallurgical vessels. The refractory lining structure can comprise a first layer and a second layer underlying at least a portion of the first layer. The refractory lining structure can further comprise a third layer underlying at least a portion of the second layer. The first layer corresponds to a "working lining" that contacts molten metal contained in a metallurgical vessel comprising the refractory lining structure. The second layer can correspond to a "back-up lining" and/or a "safety lining." If the refractory lining structure comprises a third layer (or more underlying layers), then the second layer corresponds to an intermediate refractory back-up lining and the third layer can correspond to a refractory safety lining.

For example, a tundish for use in steel continuous casting processes can comprise a refractory lining structure comprising: (1) a first layer corresponding to a refractory "working lining" that contacts molten metal contained in the tundish during use; (2) a second layer corresponding to an intermediate refractory "back-up lining" that can function as a separation layer to facilitate metal skull removal after the completion of a continuous casting campaign; and (3) a third layer corresponding to a permanent or semi-permanent refractory "safety lining" that contacts the shell of the tundish (sidewalls and/or floor). After the completion of a continuous casting campaign, residual steel that did not drain from a tundish can be cooled and solidified to form a skull, which adheres to the working lining. The skull can be removed by inverting the tundish in an operation referred to as "deskulling." The mass of the skull under the force of gravity causes a separation of the working lining from the underlying safety lining, which remains secured within the inverted tundish and does not fall out with the skull. The tundish can then be reprocessed for another continuous casting campaign by applying a new back-up lining over the safety lining, and a new working lining over the back-up lining.

It was observed that working linings comprising aluminum oxide materials (e.g., alumina-based refractory materials) provide a good combination of deskulling capability, physical stability, and chemical stability in contact with molten steel. However, it was also observed that working linings comprising aluminum oxide materials exhibit a relatively high incidence of cracking, delamination, and spalling from underlying back-up linings and/or safety linings.

During pre-heating operations, when the refractory lining structure in a tundish is heated to temperatures approaching or exceeding 1093° C. (2000° F.), an overlying refractory working lining can absorb heat energy up to or greater than four times (4×) quicker than an underlying refractory back-up lining and/or safety lining, which is insulated from the heat source by the overlying refractory working lining. Additionally, overlying working linings and underlying back-up and/or safety linings can comprise different constituent materials, such as, for example, alumina-based refractory materials and magnesia-based refractory materials, which have different thermal conductivities and coefficients of thermal expansion. Consequently, during preheating operations, an overlying refractory working lining expands more than an underlying refractory back-up lining and/or safety lining, which induces internal stresses in the refractory working lining, thereby forming weak spots. When the induced internal stresses exceed the local material strength, or when an external load is applied to a local weak spot (e.g., when contacting molten steel), the working lining can crack. Additionally, the working lining can delaminate and spall off the sidewall of the tundish, which can also damage and even detach portions of the underlying back-up lining or safety lining. This can be particularly problematic when the working lining covers the entire molten metal-contacting surface of a metallurgical vessel sidewall, and the working lining is therefore mechanically constrained in place on the vessel sidewall, and does not have space to mechanically accommodate thermal expansion.

The refractory lining structure described in this specification can decrease the incidence of (and eliminate, in some cases) crack formation, delamination, and spalling of the working lining from underlying back-up linings and/or safety linings in metallurgical vessels during preheating and use, while still facilitating deskulling after the completion of metallurgical operations. The refractory lining structure is characterized by at least one elongated expansion joint formed in and extending through the molten metal-contacting surface of the working lining, wherein the elongated expansion joint is oriented in a substantially vertical direction. The elongated expansion joint accommodates the thermal expansion of the working lining in a metallurgical vessel such as, for example, a tundish during preheating for a continuous casting operation.

A refractory lining structure for a metallurgical vessel can comprise a first layer and a second layer underlying at least a portion of the first layer. The first layer comprises a first refractory material, and the second layer comprises a second refractory material. The first refractory material and the second refractory material can independently comprise, for example, refractory materials selected from the group consisting of aluminum oxide refractory materials, magnesium oxide refractory materials, chrome refractory materials, and zirconium oxide refractory materials, and combinations of any thereof. In a specific combination, the first refractory material can comprise an aluminum oxide refractory material, and the second refractory material can comprise a magnesium oxide refractory material. Alternatively, in a specific combination, the first refractory material and the second refractory material can both comprise an aluminum oxide refractory material, wherein the first aluminum oxide refractory material and the second aluminum oxide refractory material can be the same or different in chemical composition and/or physical properties (e.g., density, porosity, thickness, and the like).

As used herein, "aluminum oxide refractory material" means a refractory material comprising at least 50% alumina ($Al_2O_3$) by mass, and a magnesium oxide refractory material means a refractory material comprising at least 50% magnesia (MgO) by mass. An aluminum oxide refractory material can comprise at least 50%, at least 60%, at least 70%, at least 80%, or at least 90% alumina ($Al_2O_3$) by mass. Aluminum oxide refractory materials can comprise additional refractory components such as, for example, silica, iron oxides, calcia, zirconia, chromia, or magnesia, or a combination of any thereof. A magnesium oxide refractory material can comprise at least 50%, at least 60%, at least 70%, at least 80%, or at least 90% magnesia (MgO) by mass. Magnesium oxide refractory materials can comprise additional refractory components such as, for example, silica, iron oxides, calcia, zirconia, chromia, or alumina, or a combination of any thereof. Aluminum oxide refractory materials and magnesium oxide refractory materials do not necessarily contain the alumina and magnesia as such, and can contain these components in a form chemically combined with other components. For example, an aluminum oxide refractory material can comprise alumina in mullite form (e.g., calcined mullite), and a magnesium oxide refractory material can comprise magnesia in a magnesite-olivine form with other refractory components such as silica, alumina, iron oxide, and calcia. A magnesium oxide refractory material can comprise olivine/dunite, or can comprise dolomite. The first refractory material can comprise an aluminum oxide refractory material, and the second refractory material can comprise olivine/dunite. The first refractory material can comprise an aluminum oxide refractory material, and the second refractory material can comprise dolomite.

Similarly, as used herein, "chrome refractory material" means a refractory material comprising at least 50% chromia ($Cr_2O_3$) by mass, and a zirconium oxide refractory material means a refractory material comprising at least 50% zirconia ($ZrO_2$) by mass. A chrome oxide refractory material can comprise at least 50%, at least 60%, at least 70%, at least 80%, or at least 90% chromia ($Cr_2O_3$) by mass, and a zirconium oxide refractory material can comprise at least 50%, at least 60%, at least 70%, at least 80%, or at least 90% zirconia ($ZrO_2$) by mass. Chrome and zirconium oxide refractory materials can comprise additional refractory components such as, for example, silica, iron oxides, calcia, chromia, zirconia, alumina, or magnesia, or a combination of any thereof. Chrome oxide refractory materials and zirconium oxide refractory materials do not necessarily contain the chromia and zirconia as such, and can contain these components in a form chemically combined with other components. For example, a zirconium oxide refractory material can comprise zirconium in zircon form (i.e., zirconium orthosilicate)

The first layer corresponds to a working lining, and the second layer can correspond to a safety lining in contact with a metal shell of a metallurgical vessel. The second layer can alternatively correspond to an intermediate lining between the working lining and a separate safety lining. The first layer and the second layer both have a first surface facing away from a sidewall of a metallurgical vessel and a second surface located opposite the first surface and facing toward the sidewall of the metallurgical vessel. The first surface of the first layer is a molten metal-contacting surface in use. The second surface of the first layer contacts the first surface of the second layer. The second surface of the second layer contacts any underlying refractory layers (e.g., a separate safety lining) or an interior surface of a metal shell of a metallurgical vessel. The first layer and the second layer, independently of each other, can have a thickness ranging from 1 millimeter (0.04 inch) to 65 millimeters (2.6 inches), or any sub-range subsumed therein, such as, for example, from 10-50 millimeters (0.4-2 inches), 15-50 millimeters (0.6-2 inches), 20-50 millimeters (0.8-2 inches), or 25-50 millimeters (1-2 inches).

At least one elongated expansion joint is formed in the first surface of the first layer and extends through the first surface of the first layer in a substantially vertical direction. As used herein, "elongated expansion joint" means a recessed volume in the surface of a working lining in a metallurgical vessel having an aspect ratio greater than or equal to 0.05, wherein the aspect ratio is the maximum length of the recessed volume measured substantially vertically on the first surface of the first layer divided by the maximum horizontal width of the recessed volume measured on the first surface of the first layer. If an elongated expansion joint has an irregular shape that varies in length along its horizontal width, for example, the maximum measured length dimension is used to calculate the aspect ratio. If an elongated expansion joint has an irregular shape that varies in horizontal width along its length, for example, the maximum measured width dimension is used to calculate the aspect ratio. The elongated expansion joint of the refractory lining structure can have an aspect ratio greater than or equal to 0.05, 0.1, 0.5, 1, 5, 10, 25, 50, 100, 150, 200, 250, 300, or 350. The elongated expansion joint of the refractory lining structure can have an aspect ratio less than or equal to 2000, 1850, 1750, 1500, 1000, 500, 450, 400, 350, 300, 250, 200, 150, 100, 50, 25 or 10. The elongated expansion joint of the refractory lining structure can have an aspect ratio in the range of 0.05-2000, or any sub-range subsumed therein, such as, for example, 100-200, 75-300, 50-450, 30-750, 0.1-1000, 1-500, or 10-150.

As used herein, "substantially vertical direction" means extending upwardly away from the floor of a metallurgical vessel toward the rim of the metallurgical vessel. Metallurgical vessels, such as tundishes, for example, can have sidewalls that are not perpendicular to the floor of the vessel, but instead extend upwardly from the vessel floor at a non-zero angle relative to a vertical axis (defined as an axis perpendicular to the horizontal plane). Accordingly, an elongated expansion joint extends in a substantially vertical direction if the elongated expansion joint extends upwardly away from the floor of a metallurgical vessel toward the rim of the metallurgical vessel.

Referring to FIGS. 1A-1D, a tundish 10 comprises a shell 12 and a refractory lining structure 18. The tundish 10 comprises a floor portion 14 and sidewall portions 16. The refractory lining structure 18 comprises a first layer 20, a second layer 30 underlying at least a portion of the first layer 20, and a third layer 40 underlying at least a portion of the second layer 30. The first layer 20 comprises a refractory material (e.g., an aluminum oxide refractory material), the second layer 30 comprises a refractory material (e.g., an aluminum oxide refractory material or a magnesium oxide refractory material), and the third layer 40 comprises a refractory material suitable for use as a safety lining in a metallurgical vessel such as the tundish 10. Examples of refractory materials suitable for use as a safety lining in a metallurgical vessel include, but are not limited to, fireclay, aluminum oxide refractory materials, magnesium oxide refractory materials, chrome refractory materials, or zirconium oxide refractory materials, or a combination of any thereof.

The third layer 40, which functions as a safety lining in the tundish 10, can be applied in the tundish shell 12 as an assembly of refractory bricks or panels, optionally mortared, or as a monolithic refractory layer. In implementations with a monolithic refractory third layer 40, the refractory material can be applied, for example, by spraying, troweling, gunning, casting, or vibrating (e.g., dry-vibrating) the third layer 40 in place using techniques known in the art. The first layer 20 and the second layer 30 can comprise monolithic refractory layers that can be applied over the third layer 40 by spraying, troweling, gunning, casting, or vibrating (e.g., dry-vibrating) the second layer 30 and the first layer 20 in place using techniques known in the art.

Still referring to FIGS. 1A-1D, the refractory lining structure 18 further comprises elongated expansion joints 50 formed in the first surface 22 of the first layer 20, and extending through the first surface 22 of the first layer 20 in a substantially vertical direction away from the floor surface 11 of the tundish 10 toward the rim 13 of the tundish 10. The floor surface 11 corresponds to the molten metal-contacting surface of a working lining 20' located on the floor 14 of the tundish 10. The elongated expansion joints 50 shown in FIGS. 1A-1D extend the entire height of the first layer 20 on the sidewall 16 of the tundish 10. It is understood, however, that the elongated expansion joints 50 can extend less than the entire height of the first layer 20 (see, for example, FIGS. 5A-6B, described below). Additionally, while two or more elongated expansion joints 50 are shown on each of the four intersecting sidewalls 16 of the tundish 10, it is understood that each sidewall of a metallurgical vessel can comprise at least one elongated expansion joint (see, for example, FIGS. 13, 14, 15A, and 15B, described below). Elongated expansion joints also can be located at the intersections of separate sidewalls in a metallurgical vessel (see, for example, FIG. 13).

Figure 1C:
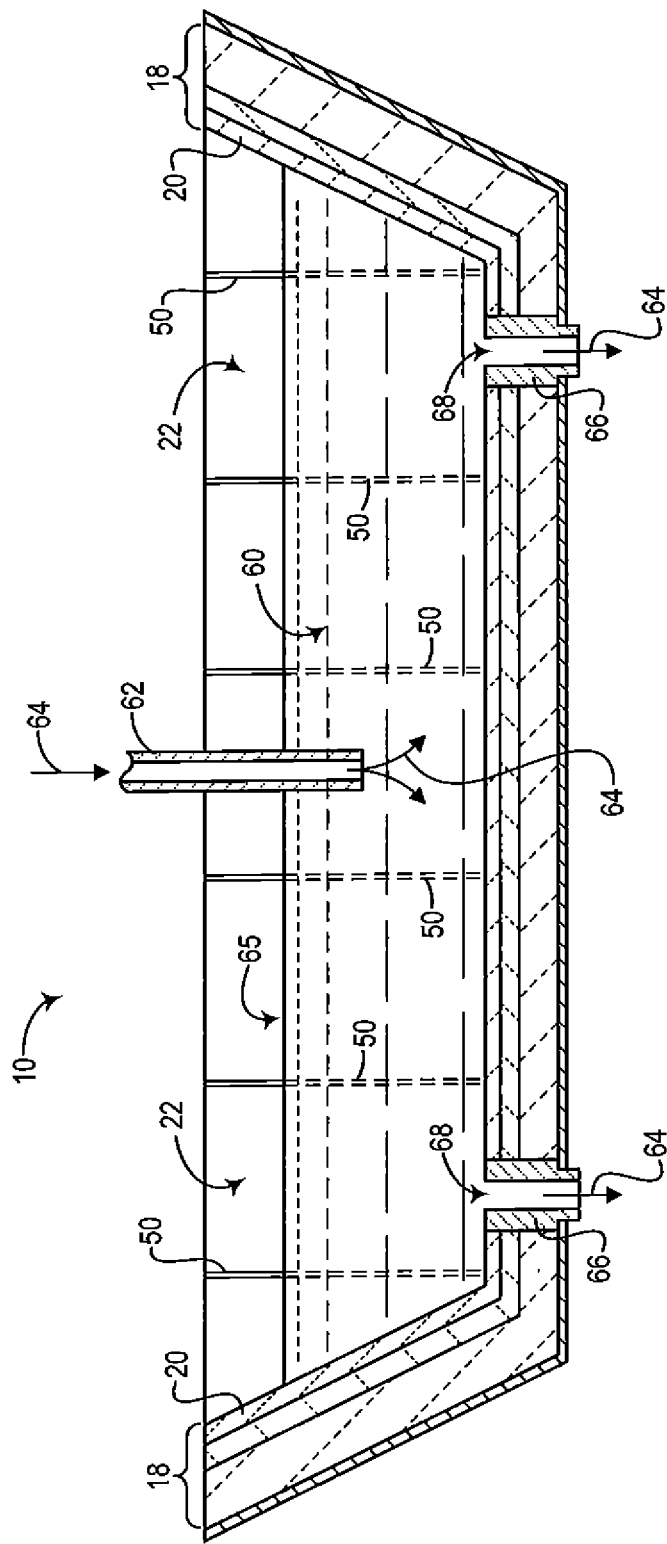
Figure 1D:
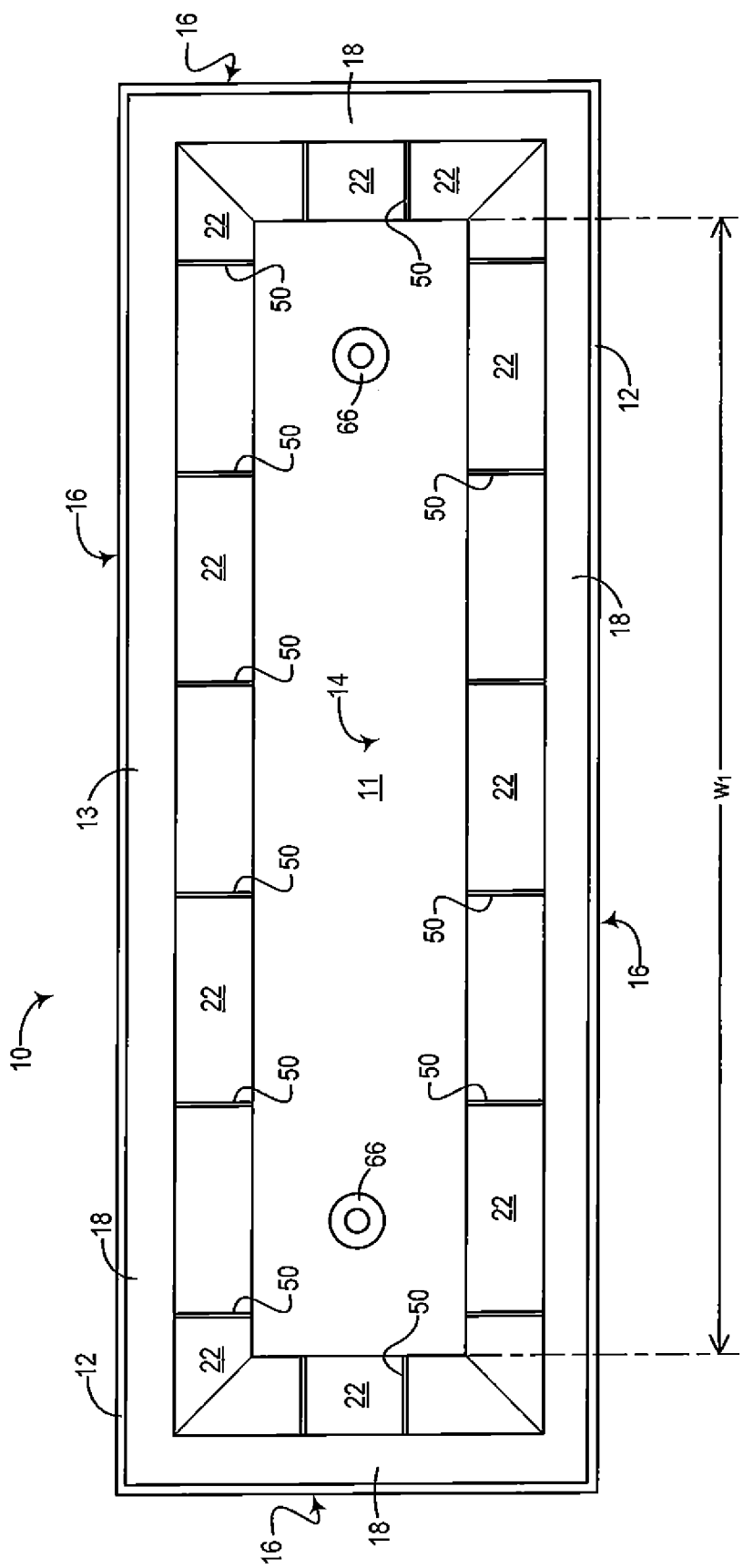

Referring to FIG. 1C, during operation in a continuous casting process, the tundish 10 contains molten steel 60. The molten steel 60 is introduced into the tundish 10 from a ladle (not shown) through a ladle shroud 62 (arrows 64 indicate the flow of the molten steel 60). The molten steel 60 flows out from the tundish into continuous casting molds (not shown) through openings 68 in ladle blocks 66. The molten steel 60 in the tundish 10 covers the elongated expansion joints 50 formed in the first surface 22 of the first layer 20 up to just below a slag line 65 (slag omitted for clarity).

Figure 2A:
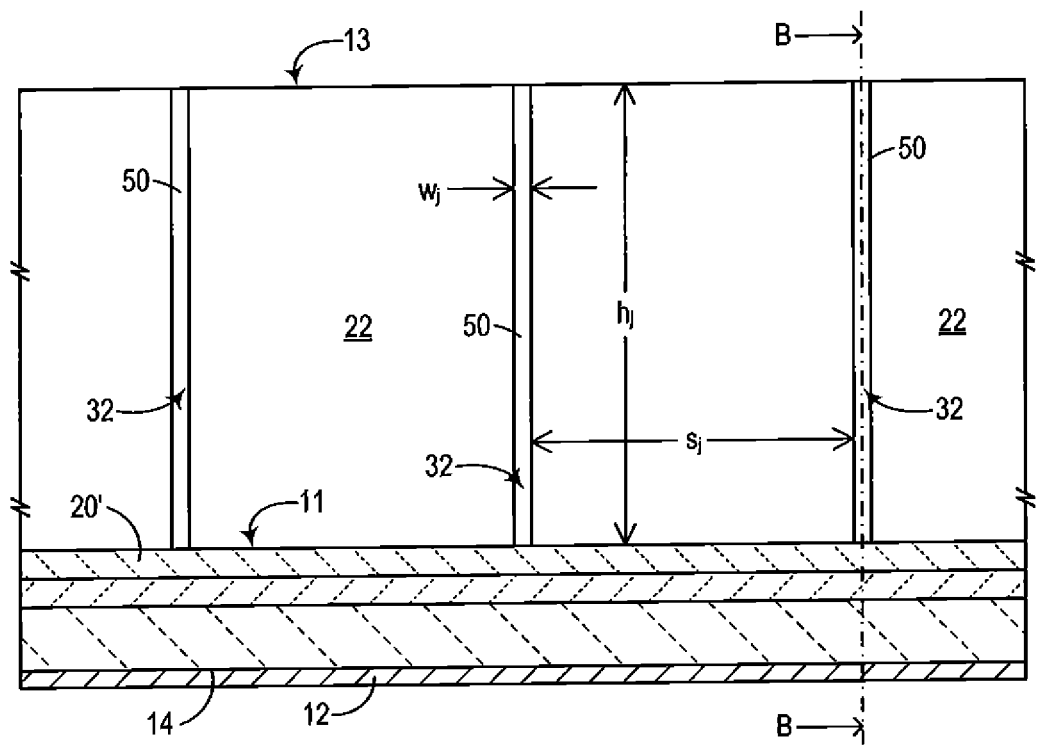
FIG. 2A is a sectioned, elevational (side) view, not to scale, of a portion of a sidewall and floor of a tundish showing elongated expansion joints formed in the first layer (working lining) of a refractory lining structure on the sidewall of the tundish, the elongated expansion joints extending through the entire thickness of the first layer, and extending the entire height of the first layer on the tundish sidewall.
Figure 2B:
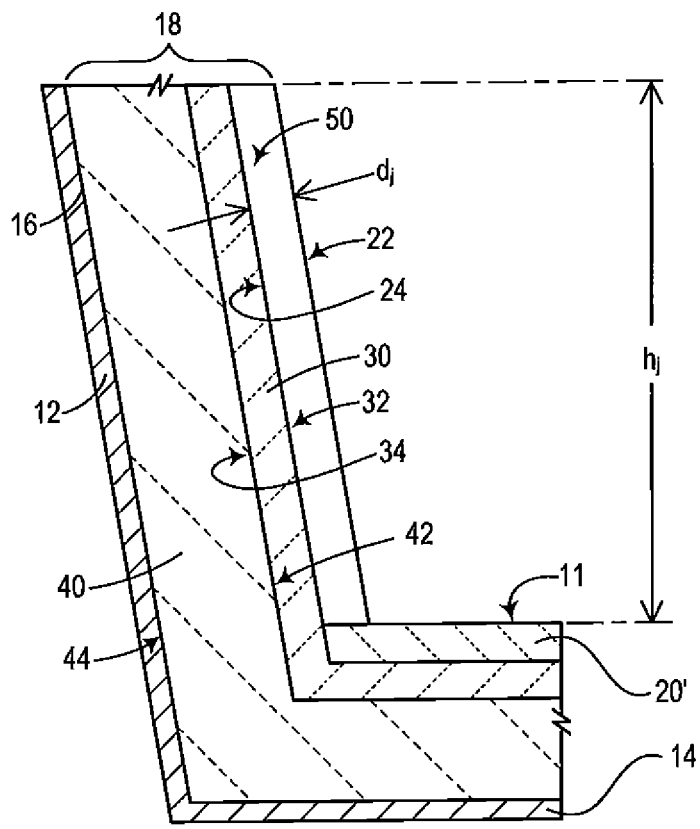
FIG. 2B is a partial, sectioned view, not to scale, of the portion of the tundish sidewall and floor viewed perpendicular to line B-B in FIG. 2A.

FIGS. 2A and 2B show a portion of the tundish 10 illustrated in FIGS. 1A-1D. The first layer 20 of the refractory lining structure 18 comprises a first surface 22 facing away from the sidewall 16 of the tundish 10, and a second surface 24 located opposite the first surface and facing toward the sidewall 16 of the tundish 10. The second layer 30 comprises a first surface 32 facing away from the sidewall 16 of the tundish 10, and a second surface 34 located opposite the first surface and facing toward the sidewall 16 of the tundish 10. The third layer 40 comprises a first surface 42 facing away from the sidewall 16 of the tundish 10, and a second surface 44 located opposite the first surface and facing toward the sidewall 16 of the tundish 10.

The first surface 22 of the first layer 20 is a molten metal-contacting layer in the tundish 10. The second surface 24 of the first layer 20 contacts the first surface 32 of the second layer 30. The second surface 34 of the second layer 30 contacts the first surface 42 of the third layer 40. The second surface 44 of the third layer 40 contacts the inwardly-facing surface of the tundish shell 12 along the tundish sidewall 16.

The elongated expansion joints 50 are formed in the first surface 22 of the first layer 20 of the refractory lining structure 18 on the sidewall 16 of the tundish 10. The elongated expansion joints 50 extend through the entire thickness of the first layer 20 to a depth dimension ($d_j$). As shown in FIG. 2B, the depth dimension ($d_j$) of the elongated expansion joints 50 is 100% of (i.e., coextensive with) the thickness of the first layer 20, and extends from the first surface 22 of the first layer 20 to the second surface 24 of the first layer 20. The first surface 32 of the second layer 30 is therefore partially exposed through the elongated expansion joints 50, as shown in FIG. 2A. The depth dimension ($d_j$) of the elongated expansion joints 50 can be less than 100% of the thickness of the first layer 20 (see, for example, FIGS. 4A and 4B, described below), and can range from 1-100%, 20-100%, 25-100%, 50-100% or 75-100% of the thickness of the first layer 20. For example, the depth dimension ($d_j$)

of the elongated expansion joints 50 can be, independently, at least 25%, at least 50%, or at least 75% of the thickness of the first layer 20. Although not shown, it is understood that the depth dimension ($d_j$) of the elongated expansion joints 50 can be greater than 100% of the thickness of the first layer 20. For example, the depth dimension ($d_j$) of the elongated expansion joints 50 can extend through the first surface 32 of the second layer 30 and, therefore, extend partially through the thickness of the second layer 30.

Still referring to FIGS. 2A and 2B, the elongated expansion joints 50 extend in a substantially vertical direction away from the floor surface 11 of the tundish 10 toward the rim 13 of the tundish 10. The elongated expansion joints 50 extend the entire height of the first layer 20 on the tundish sidewall 16 to a vertical height dimension ($h_j$). The vertical height dimension ($h_j$) of the elongated expansion joints 50 is therefore 100% of (i.e., coextensive with) the vertical height dimension of the first surface 22 of the first layer 20. The vertical height dimension ($h_j$) of the elongated expansion joints 50 can be less than 100% of the vertical height dimension of the first surface 22 of the first layer 20 (see, for example, FIGS. 5A-6B, described below). For example, the vertical height dimension ($h_j$) of the elongated expansion joints 50 can be, independently, at least 25%, at least 50%, or at least 75% of the vertical height dimension ($h_1$) of the first surface 22 of the first layer 20, or within a range of 25-100%, 50-100%, or 75-100% of the vertical height dimension ($h_1$) of the first surface 22 of the first layer 20.

It is noted that the vertical height dimension of an elongated expansion joint is measured along the vertical axis (defined as an axis perpendicular to the horizontal plane). Therefore, the vertical height dimension of an elongated expansion joint can be different than the length of the elongated expansion joint (which, as described above, is used to calculate the aspect ratio of the elongated expansion joint). For example, an elongated expansion joint on a sidewall of a metallurgical vessel that is outwardly angled and therefore not perpendicular to the floor of the metallurgical vessel will have a length that is greater than its vertical height dimension. Likewise, an elongated expansion joint having a non-linear contour will have a length that is greater than its vertical height dimension.

As illustrated in FIG. 2A, the elongated expansion joints 50 have a horizontal width dimension ($w_j$) substantially parallel to the first surface 22 of the first layer 20. The horizontal width dimension ($w_j$) can range from 1 millimeter (0.04 inch) to 1830 millimeters (72 inches), or any sub-range subsumed therein, such as, for example, 1-100 millimeters (0.04-4 inches), 5-50 millimeters (0.20-2.00 inches), 5-25 millimeters (0.20-1.00 inches), or 5-13 millimeters (0.20-0.51 inch).

As described above, it was observed that during tundish pre-heating, an overlying refractory working lining expands more than an underlying refractory back-up lining and/or safety lining, which can cause formation of weak spots, cracking, delamination, and spalling. More specifically, it was observed that an overlying refractory working lining can linearly expand at least 1% during a pre-heating operation. Accordingly, to effectively accommodate the thermal expansion, the one or more elongated expansion joints formed in the first layer (working lining) of a refractory lining structure, extending in a substantially vertical direction, should, at least on some implementations, have horizontal width dimensions that provide for 2.54 cm (1 inch) of linear expansion for every 254 centimeters (100 inches) of the horizontal dimension of the first layer (working lining). In other words, the ratio of the sum of the horizontal width dimensions of the one or more elongated expansion joints formed in the first layer (working lining) of a refractory lining structure, to the total horizontal dimension of the first layer containing the elongated expansion joints, should be at least 0.01 (measured at the intersection of the first surface of the first layer and the floor surface of the tundish or other metallurgical vessel), and may be in the ranges 0.005-0.02, 0.01-0.02, 0.005-0.05, 0.01-0.05, or 0.005-0.10.

Referring again to FIGS. 1B, 1D, and 2A, the ratio of the sum of the horizontal width dimensions ($w_j$) of the elongated expansion joints 50 (see FIG. 2A) to the total horizontal dimension ($w_1$) of the first surface 22 of the first layer 20 (see FIGS. 1B and 1D), on each of the four sidewalls 16 of the tundish 10, is at least 0.005:

$$\text{"width ratio"} \equiv \frac{\sum_{j=1}^{n} w_j}{w_1} \geq 0.005;$$

wherein the first surface 22 of the first layer 20 on each tundish sidewall 16 contains "n" number of elongated expansion joints, each with a horizontal width ($w_j$), and each extending substantially vertically; and wherein the total horizontal width dimension ($w_1$) of the first surface 22 of the first layer 20 on each sidewall 16 is measured at the intersection of the first surface 22 with the floor surface 11. Accordingly, for metallurgical vessels comprising multiple interconnected sidewalls (tundish 10 having four sidewalls 16—two sidewalls containing six elongated expansion joints, and two sidewalls containing two elongated expansion joints, see FIGS. 1A and 1D), the width ratio feature can hold for at least one of the multiple sidewalls, and in some implementations, holds for all the constituent sidewalls.

The width ratio can be at least 0.005, 0.010, at least 0.015, at least 0.020, at least 0.025, or at least 0.030. For example, a width ratio of 0.017 provides sufficient space for 2.54 centimeters (1 inch) of horizontal expansion per 152 centimeters (60 inches) of the horizontal dimension of the first surface of the first layer, and a width ratio of 0.025 provides sufficient space for 2.54 centimeters (1 inch) of horizontal expansion per 102 centimeters (40 inches) of the horizontal dimension of the first surface of the first layer. The width ratio must be less than 1 (a width ratio of 1 corresponds to an elongated expansion joint having a width that extends the total horizontal dimension ($w_1$) of the first surface of the first layer. The width ratio can be less than 1, less than 0.90, less than 0.75, less than 0.50, less than 0.25, less than 0.15, less than 0.10, or less than 0.05. The width ratio can range from 0.005 to less than 1, or any sub-range subsumed therein, such as, for example, 0.010-0.500 or 0.010-0.100.

As illustrated in FIG. 2A, each elongated expansion joint 50 is spaced apart from adjacent elongated expansion joints 50 by a horizontal spacing ($s_j$). The horizontal spacing ($s_j$) between each elongated expansion joint 50 can be uniform or vary independently. Each elongated expansion joint 50 can be spaced apart from adjacent elongated expansion joints 50 by a minimum horizontal spacing ($s_j$) of 2.54 centimeters (1 inch). The number of elongated expansion joints 50, the horizontal spacing ($s_j$) between each elongated expansion joint 50, and the horizontal width dimension ($w_j$) of each elongated expansion joint 50, can be configured together to provide a width ratio of at least 0.010, as described above.

The elongated expansion joints can be formed in the first surface of the first layer (working lining) by cutting the joints into the first layer after it is applied over the second layer. For example, a saw, mill, or other suitable cutting device can be used to cut the elongated expansion joints into the first surface of the first layer with a given length, depth dimension, vertical height dimension, horizontal width dimension, contour, transverse shape, and orientation in the first layer.

Figure 3:
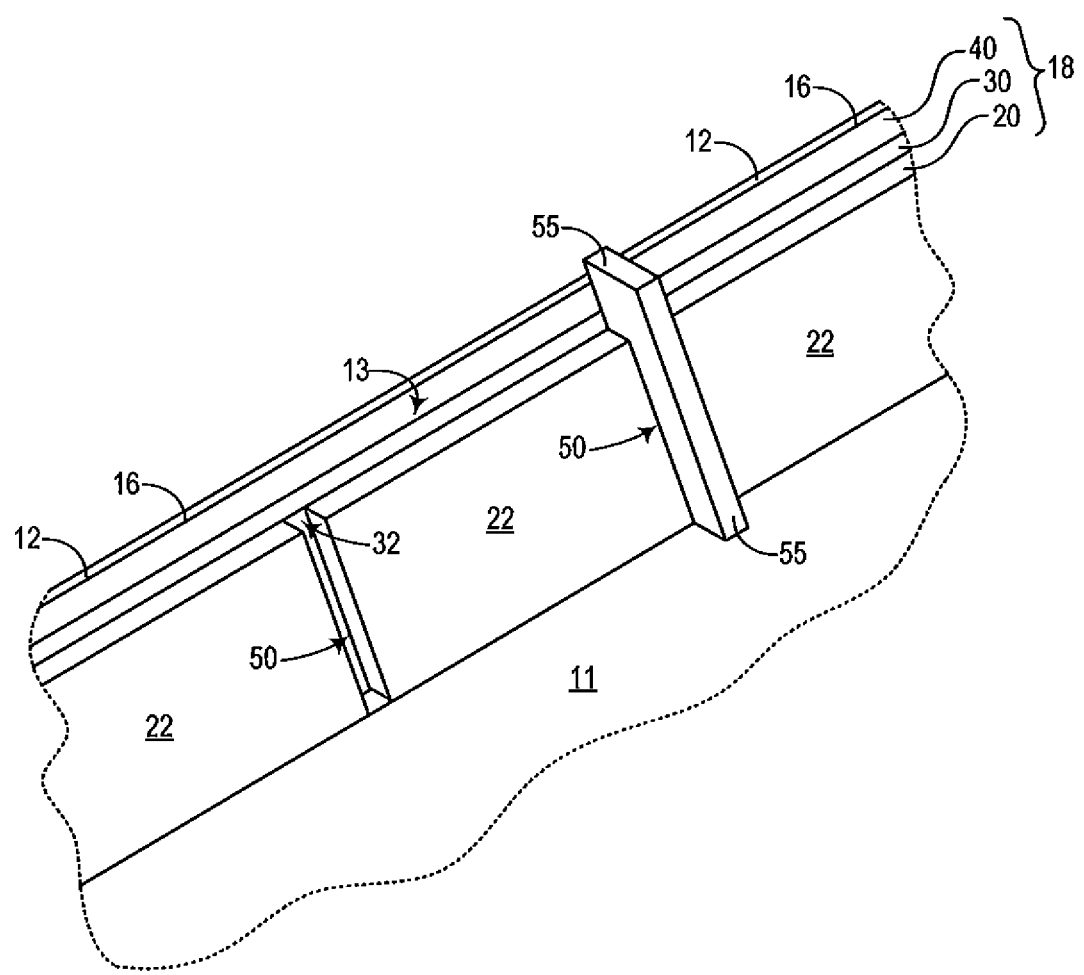
FIG. 3 is a partial isometric view, not to scale, of a portion of a tundish sidewall and floor showing a sacrificial or otherwise removable insert forming an elongated expansion joint in the first layer (working lining) of a refractory lining structure on the tundish sidewall.

Alternatively, the elongated expansion joints can be formed in the first surface of the first layer (working lining) using sacrificial or otherwise removable inserts or spacers. For example, referring to FIG. 3, after the third layer 40 (functioning as a safety lining, for example) and the second layer 30 (functioning as a deskulling separation layer, for example), a sacrificial or otherwise removable insert/spacer 55 can be positioned on the first surface 32 of the second layer 30. The sacrificial/removable insert/spacer 55 has dimensions and a three-dimensional shape that corresponds, at least in part, to the dimensions and three-dimensional shape of the elongated expansion joints 50. The first layer 20 can then be applied onto the first surface 32 of the second layer 30 and around the sacrificial/removable insert/spacer 55, for example, by spraying, troweling, gunning, casting, or vibrating (e.g., dry-vibrating) the first layer 20 in place.

The insert/spacer 55 can be made of a sacrificial material, such as, for example, wood, plastic, cardboard, plywood, particle board, oriented strand board, or other decomposable material, which decomposes during a dry-out operation when the applied layers are heated to relatively high temperatures (e.g., at least 700° F. (371° C.)). During the dry-out operation, the sacrificial insert/spacer 55 can pyrolyze or otherwise volatilize (i.e., burn-out), leaving a negative impression in the first layer 20, and thereby forming an elongated expansion joint 50.

The insert/spacer 55 can be made of a non-sacrificial material, such as, for example, metal, which does not decompose during a dry-out operation, provided the material of the first layer (e.g., an aluminum oxide refractory material) does not strongly adhere to the non-sacrificial material so that the insert/spacer 55 can be physically removed from the first layer 20, leaving a negative impression in the first layer 20, and thereby forming an elongated expansion joint 50. The removable insert/spacer 55 can be removed after application of the material forming the first layer 20, and before a subsequent dry-out operation, provided the "wet" layer has sufficient cohesion and structural integrity to maintain the negative impression formed by the insert/spacer 55 during a dry-out operation; otherwise, the insert/spacer 55 can be removed after completion of a dry-out operation or after at least a portion of a dry-out operation.

Figure 4A:
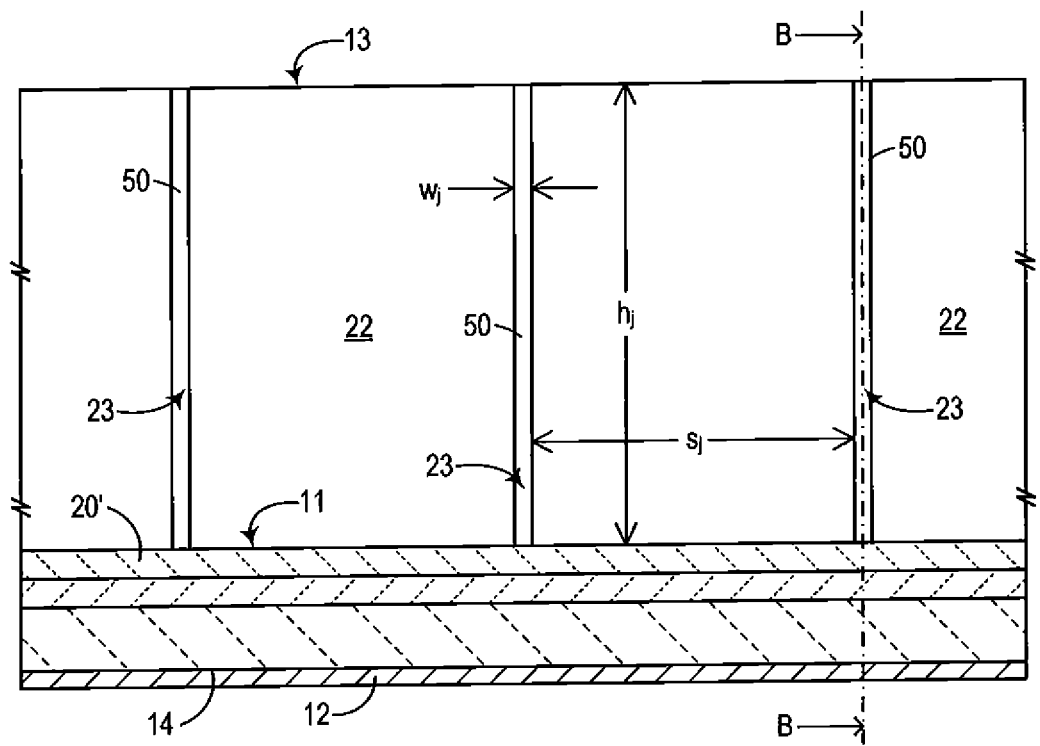
FIG. 4A is a sectioned, elevational (side) view, not to scale, of a portion of a tundish sidewall and floor showing elongated expansion joints formed in the first layer (working lining) of a refractory lining structure on the tundish sidewall, the elongated expansion joints extending through a portion of the thickness of the first layer, and extending the entire height of the first layer on the tundish sidewall.
Figure 4B:
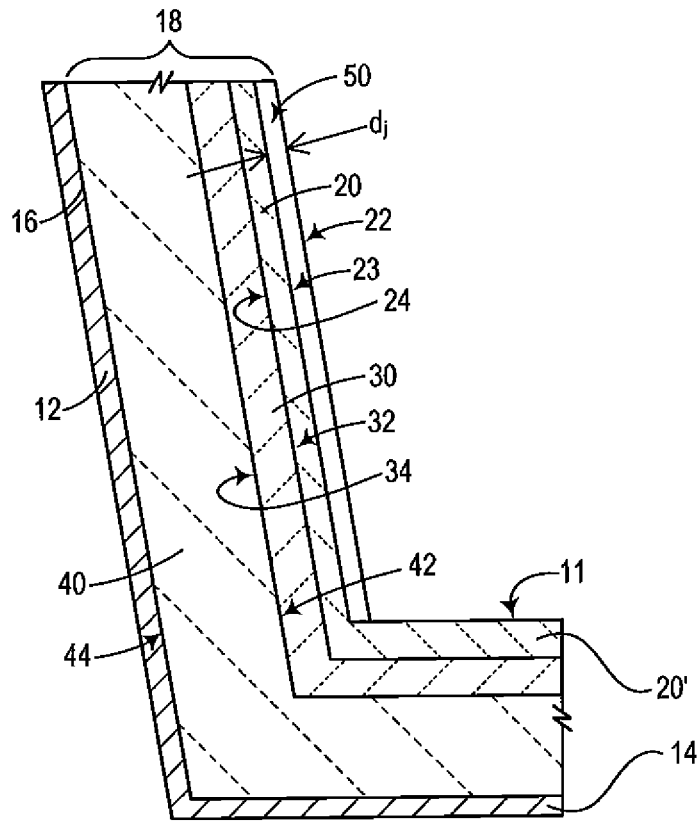
FIG. 4B is a partial, sectioned view, not to scale, of the portion of the tundish sidewall and floor viewed perpendicular to line B-B in FIG. 4A.

As described above, the depth dimension of the elongated expansion joints 50 can be less than 100% of the thickness of the first layer 20. As shown in FIGS. 4A and 4B, the elongated expansion joints 50 extend the entire height of the first surface 22 of the first layer 20 on the tundish sidewall 16, but only extend through a portion of the thickness of the first layer 20. Referring to FIG. 4B, the depth dimension (d) of the elongated expansion joints 50 extends from the first surface 22 of the first layer 20 to a recessed surface 23 of the first layer 20. The first surface 32 of the second layer 30 remains covered by the portion of the thickness of the first layer 20 between the recessed surface 23 and the second surface 24 of the first layer 20. The depth dimension (d) of the elongated expansion joints 50 can range from 1 to less than 100% of the thickness of the first layer 20, and can range from 1-100%, 20-100%, 25-100%, 50-100% or 75-100% of the thickness of the first layer 20. For example, the depth dimension (d) of the elongated expansion joints 50 can be, independently, at least 25%, at least 50%, or at least 75% of the thickness of the first layer 20.

Figure 5A:
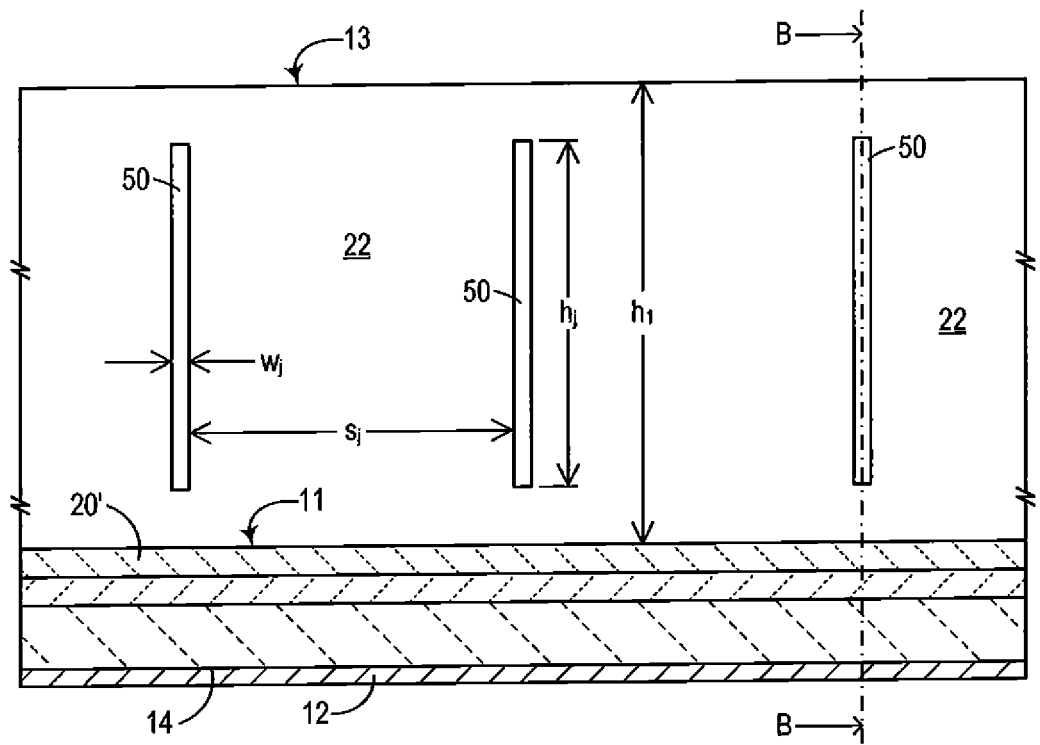
FIG. 5A is a sectioned, elevational (side) view, not to scale, of a portion of a tundish sidewall and floor showing elongated expansion joints formed in the first layer (working lining) of a refractory lining structure on the tundish sidewall, the elongated expansion joints extending through the entire thickness of the first layer, and extending a portion of the height of the first layer on the tundish sidewall (from a point above the floor surface of the working lining to a point below the rim of the tundish)
Figure 5B:
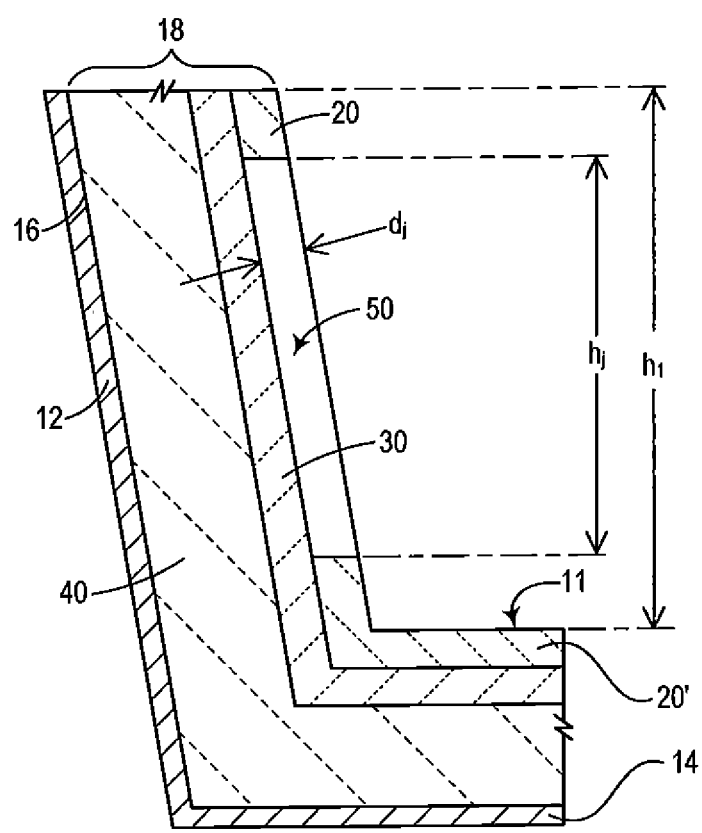
FIG. 5B is a partial, sectioned view, not to scale, of the portion of the tundish sidewall and floor viewed perpendicular to line B-B in FIG. 5A.

As described above, the vertical height dimension of the elongated expansion joints 50 can be less than 100% of the vertical height dimension of the first surface 22 of the first layer 20. As shown in FIGS. 5A and 5B, the elongated expansion joints 50 extend through the entire thickness of the first layer 20 (although it is understood that the elongated expansion joints 50 can extend through a portion of the thickness of the first layer 20 as illustrated above in connection with FIGS. 4A and 4B), but only extend a portion of the height of the first surface 22 of the first layer 20 on the tundish sidewall 16. The elongated expansion joints 50 have a vertical height dimension ($h_j$) and the first surface 22 of the first layer 20 on the tundish sidewall 16 has a vertical height dimension ($h_1$), wherein $h_j$<$h_1$. The vertical height dimension ($h_j$) of the elongated expansion joints 50 can be, independently, at least 25%, at least 50%, or at least 75% of the vertical height dimension of the first surface 22 of the first layer 20 (i.e., $h_j/h_1 \geq 0.25$, $h_j/h_1 \geq 0.50$, or $h_j/h_1 \geq 0.75$), or within a range of 25-100%, 50-100%, or 75-100% of the vertical height dimension ($h_1$) of the first surface 22 of the first layer 20. The elongated expansion joints 50 extend in a substantially vertical direction away from the floor surface 11 of the tundish 10, toward the rim 13 of the tundish 10, but the elongated expansion joints 50 extend from a point above the floor surface 11 to a point below the rim 13.

Figure 6A:
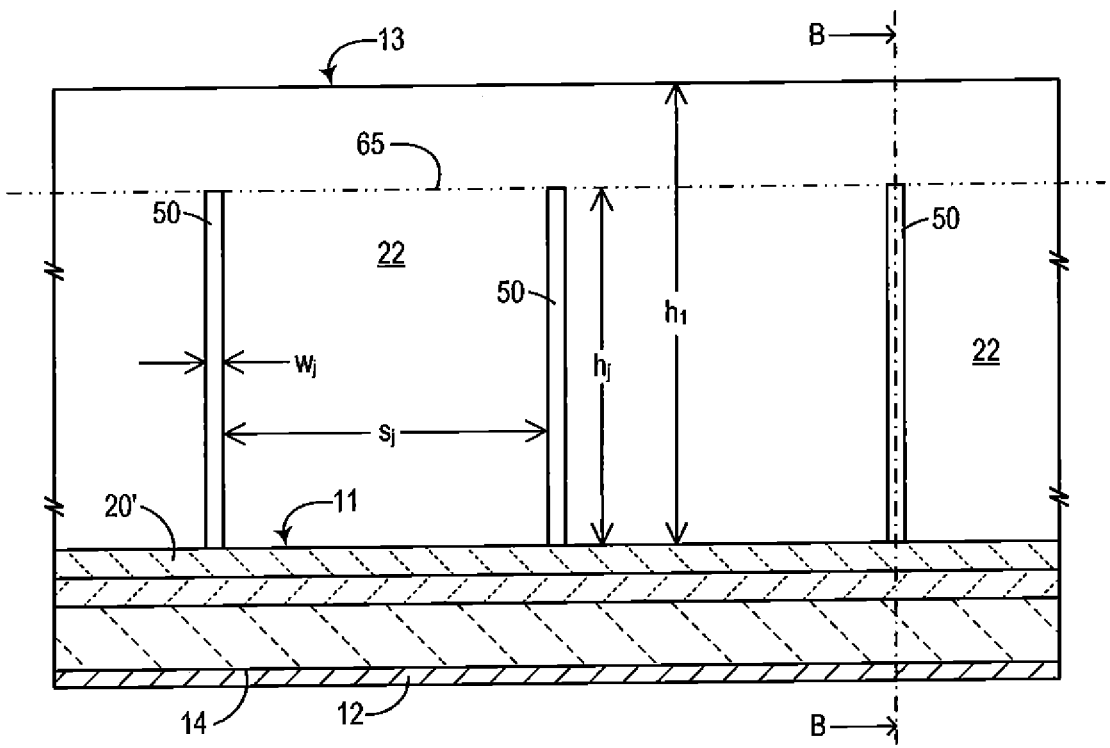
FIG. 6A is a sectioned, elevational (side) view, not to scale, of a portion of a tundish sidewall and floor showing elongated expansion joints formed in the first layer (working lining) of a refractory lining structure on the tundish sidewall, the elongated expansion joints extending through the entire thickness of the first layer, and extending a portion of the height of the first layer on the tundish sidewall (from the floor surface of a working lining to the slag line)
Figure 6B:
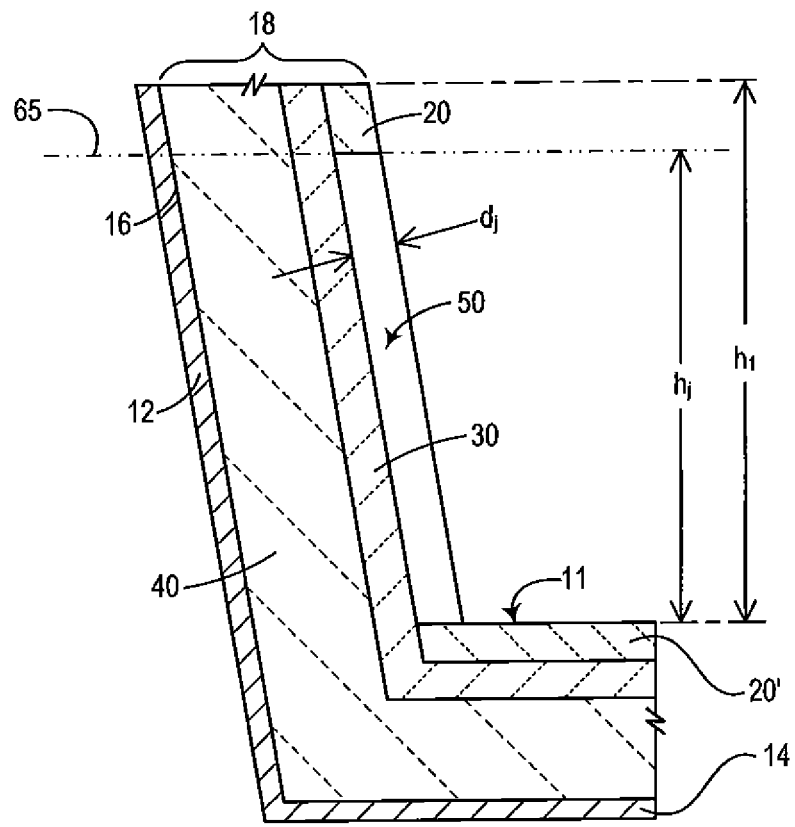
FIG. 6B is a partial, sectioned view, not to scale, of the portion of the tundish sidewall and floor viewed perpendicular to line B-B in FIG. 6A.

FIGS. 6A and 6B illustrate another example of a refractory lining structure 18 comprising elongated expansion joints 50 having vertical height dimensions ($h_j$) that are less than 100% of the vertical height dimension of the first surface 22 of the first layer 20 ($h_1$)—i.e., $h_j$<$h_1$. As shown in FIGS. 6A and 6B, the elongated expansion joints 50 extend through the entire thickness of the first layer 20 (although it is understood that the elongated expansion joints 50 can extend through a portion of the thickness of the first layer 20 as illustrated above in connection with FIGS. 4A and 4B), but only extend along the portion of the height of the first surface 22 of the first layer 20 on the tundish sidewall 16 located between the floor surface 11 and a slag line 65 (see FIG. 1C, described above).

Figure 7A:
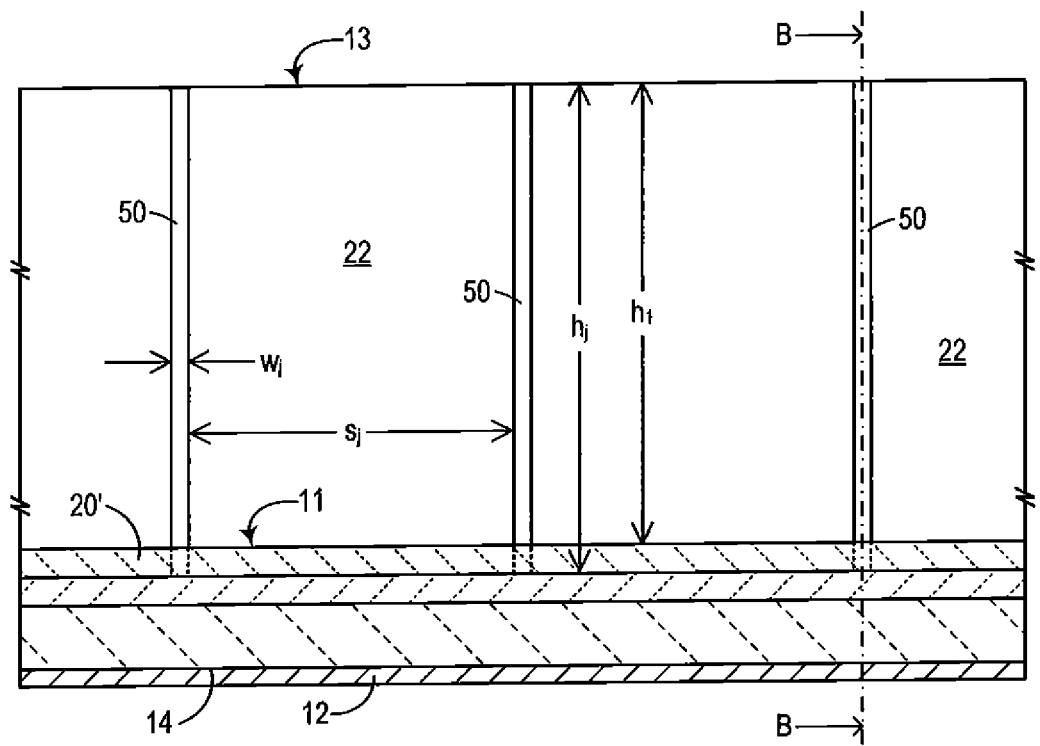
FIG. 7A is a sectioned, elevational (side) view, not to scale, of a portion of a tundish sidewall and floor showing elongated expansion joints formed in the first layer (working lining) of a refractory lining structure on a tundish sidewall, the elongated expansion joints extending through the entire thickness of the first layer, and extending below the floor surface of the working lining on the tundish floor.
Figure 7B:
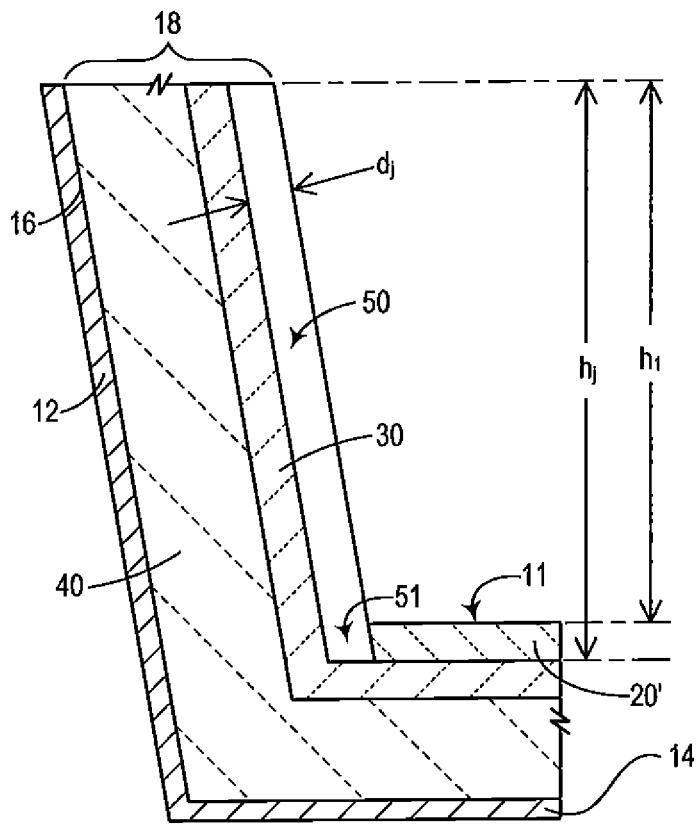
FIG. 7B is a partial, sectioned view, not to scale, of the portion of the tundish sidewall and floor viewed perpendicular to line B-B in FIG. 7A.

FIGS. 7A and 7B illustrate an example of a refractory lining structure 18 comprising elongated expansion joints 50 comprising portions 51 that extend below the floor surface 11, which corresponds to the molten metal-contacting surface of a working lining 20' located on the floor 14 of a tundish. The sub-floor portion 51 of the expansion joint 50 can be formed, for example, when using a sacrificial/removable insert/spacer (see the insert/spacer 55 in FIG. 3), and the material forming the first layer 20 and the floor working lining 20' are applied around the sacrificial/removable insert/spacer, for example, by spraying, troweling, gunning, casting, or vibrating (e.g., dry-vibrating) the first layer 20 and the floor working lining 20' in place.

Figure 8:
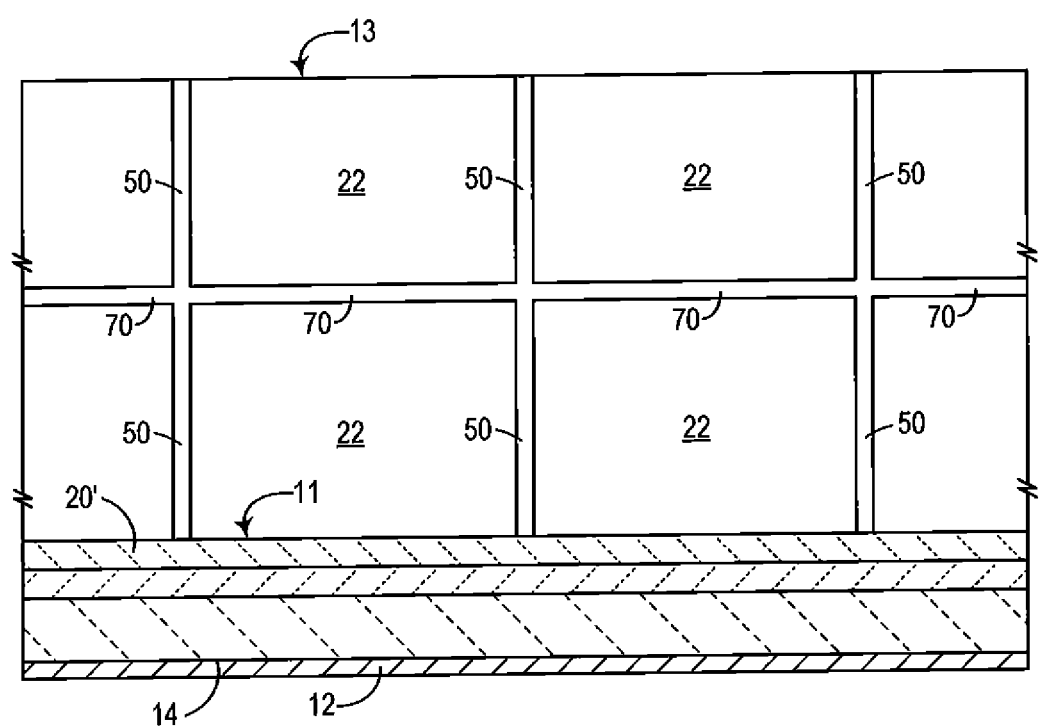
FIG. 8 is a sectioned, elevational (side) view, not to scale, of a portion of a tundish sidewall and floor showing an elongated expansion joint located horizontally, and elongated expansion joints located substantially vertically, on the tundish sidewall, the elongated expansion joints formed in the first layer (working lining) of a refractory lining structure on the tundish sidewall.

In addition to the at least one elongated expansion joint extending in a substantially vertical direction, the refractory lining structure can further comprise at least one elongated expansion joint formed in the first surface of the first layer and extending in a horizontal direction. A horizontally extending, elongated expansion joint 70 is shown in FIG. 8 intersecting the substantially vertically extending, elongated expansion joints 50. The horizontally extending, elongated expansion joint 70 can extend the entire horizontal length of the first surface 22 of the first layer 20, or a portion of the horizontal length of the first surface 22 of the first layer 20. Although one horizontally extending, elongated expansion joint 70 is shown in FIG. 8, it is understood that two or more horizontally extending, elongated expansion joints may be formed in the first surface of the first layer in a refractory lining structure in accordance with this specification. Additionally, while the horizontally extending, elongated expansion joint 70 is shown in FIG. 8 oriented parallel to a horizontal axis, it is understood that a refractory lining structure in accordance with this specification can comprise a substantially horizontally extending, elongated expansion joint in which the joint is angled up to 45° relative to a horizontal axis. A refractory lining structure in accordance with this specification also can comprise a substantially horizontally extending, elongated expansion joint having a non-linear contour such as, for example, a polyline contour or a curved contour (e.g., having an arc shape, sine wave shape, or spline shape).

Figure 9:
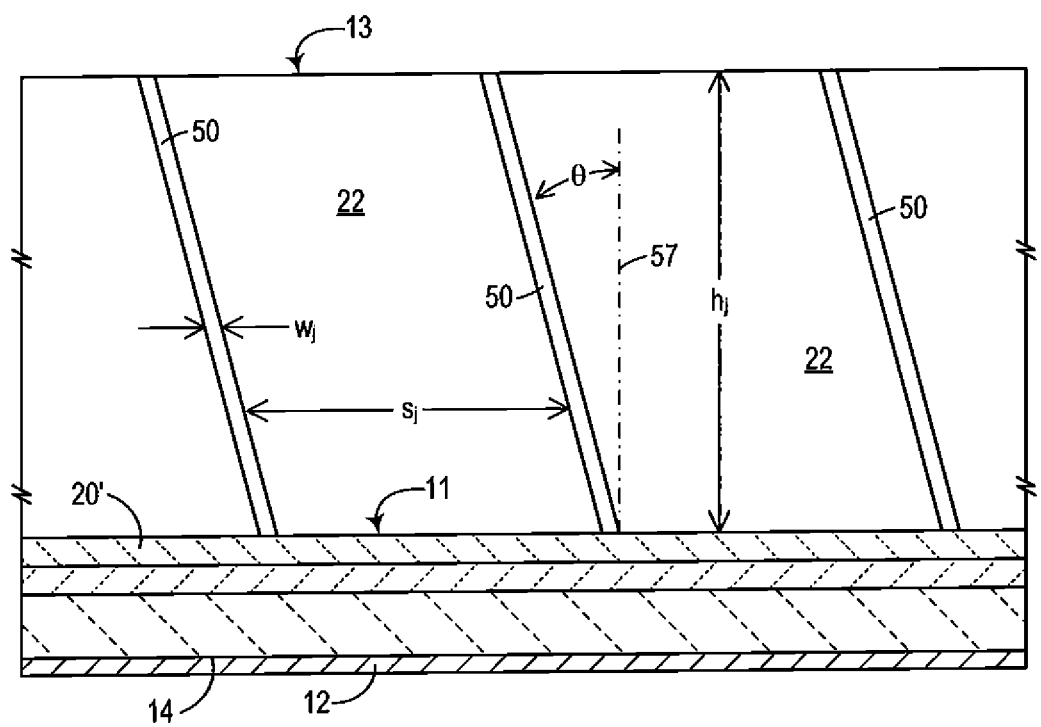
FIG. 9 is a sectioned, elevational (side) view, not to scale, of a portion of a tundish sidewall and floor showing elongated expansion joints having a straight diagonal contour, the elongated expansion joints extending substantially vertically on the tundish sidewall, and the elongated expansion joints formed in the first layer (working lining) of a refractory lining structure on the tundish sidewall.

The elongated expansion joints described above are illustrated having a substantially vertical linear contour (i.e., a vertical line contour). However, a refractory lining structure in accordance with this specification can comprise a substantially vertically extending, elongated expansion joint having other contours and/or orientations. For example, as illustrated in FIG. 9, an elongated expansion joint 50 can have a substantially vertical linear contour oriented diagonally across the first surface 22 of the first layer 20 (i.e., a diagonal line contour). The elongated expansion joint 50 can form a diagonal angle θ ranging from greater than zero to 45° relative to a substantially vertical axis 57 in the plane of the first surface 22 of the first layer 20.

Figure 10:
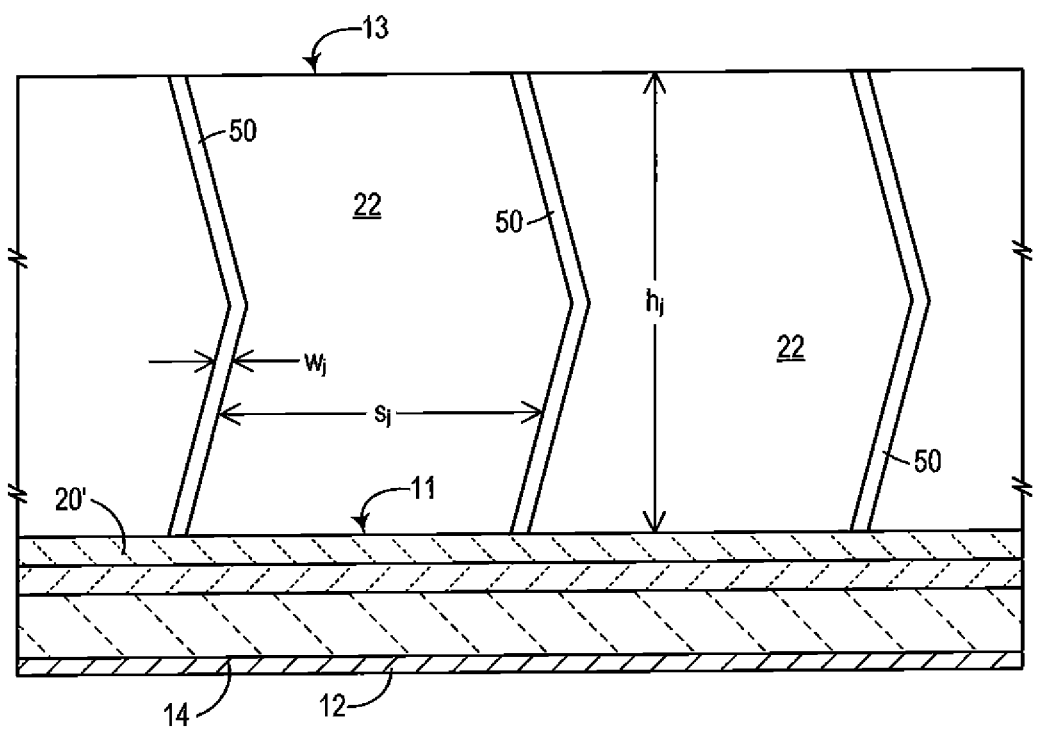
FIG. 10 is a sectioned, elevational (side) view, not to scale, of a portion of a tundish sidewall and floor showing elongated expansion joints having a polyline contour, the elongated expansion joints extending substantially vertically on the tundish sidewall, and the elongated expansion joints formed in the first layer (working lining) of a refractory lining structure on the tundish sidewall.
Figure 11:
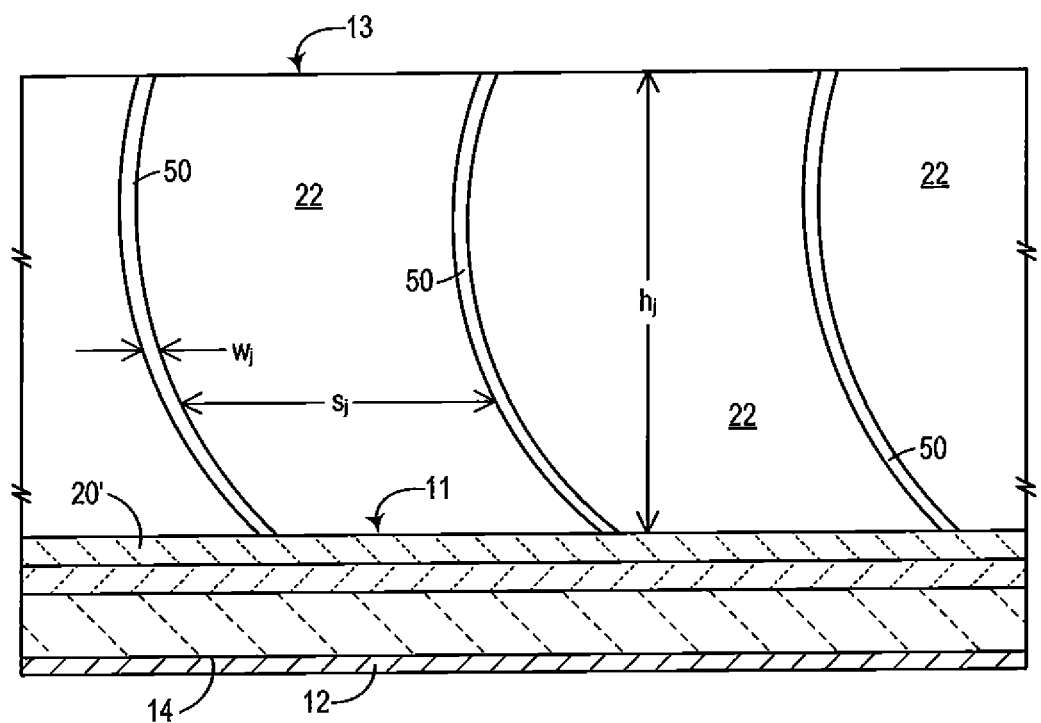
FIG. 11 is a sectioned, elevational (side) view, not to scale, of a portion of a tundish sidewall and floor showing elongated expansion joints having a curved contour, the elongated expansion joints extending substantially vertically on the tundish sidewall, and the elongated expansion joints formed in the first layer (working lining) of a refractory lining structure on the tundish sidewall.
Figure 12:
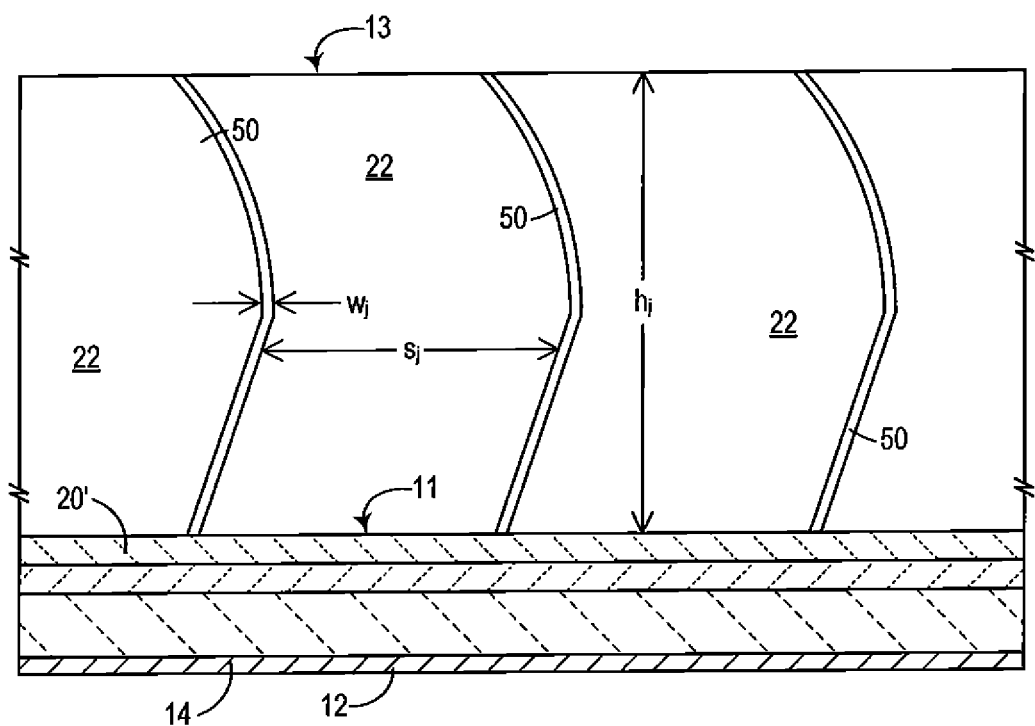
FIG. 12 is a sectioned, elevational (side) view, not to scale, of a portion of a tundish sidewall and floor showing elongated expansion joints having a combined curved and straight diagonal contour, the elongated expansions joints extending substantially vertically on the tundish sidewall, and the elongated expansion joints formed in the first layer (working lining) of a refractory lining structure on the tundish sidewall.

A refractory lining structure in accordance with this specification also can comprise a substantially vertically extending, elongated expansion joint having a non-linear contour such as, for example, a polyline contour (see FIG. 10) or a curved contour (e.g., having an arc shape, as shown in FIG. 11), sine wave shape, or spline shape). FIG. 12 shows a substantially vertically extending, elongated expansion joint 50 having a contour combining a diagonal line and a curve. Thus, a refractory lining structure in accordance with this specification can comprise an elongated contour selected from the group consisting of a vertical line, a diagonal line, a polyline, and a curve, and a combination of any thereof.

The invention described in this specification includes a metallurgical vessel comprising a refractory lining structure, as described above. A metallurgical vessel can comprise a floor and a sidewall extending from the floor in a substantially vertical direction. The refractory lining structure, as described above, can be located on at least a portion of the sidewall of the metallurgical vessel. The metallurgical vessel can comprise a tundish configured for use in a continuous casting operation, wherein the tundish comprises at least four intersecting sidewalls. The refractory lining structure, as described above, can be located on at least a portion of at least one of the four sidewalls. Although the tundish 10 described above comprises four sidewalls in a rectangular plan orientation, it is understood that the refractory lining structure can be used with different tundish designs.

Figure 13:
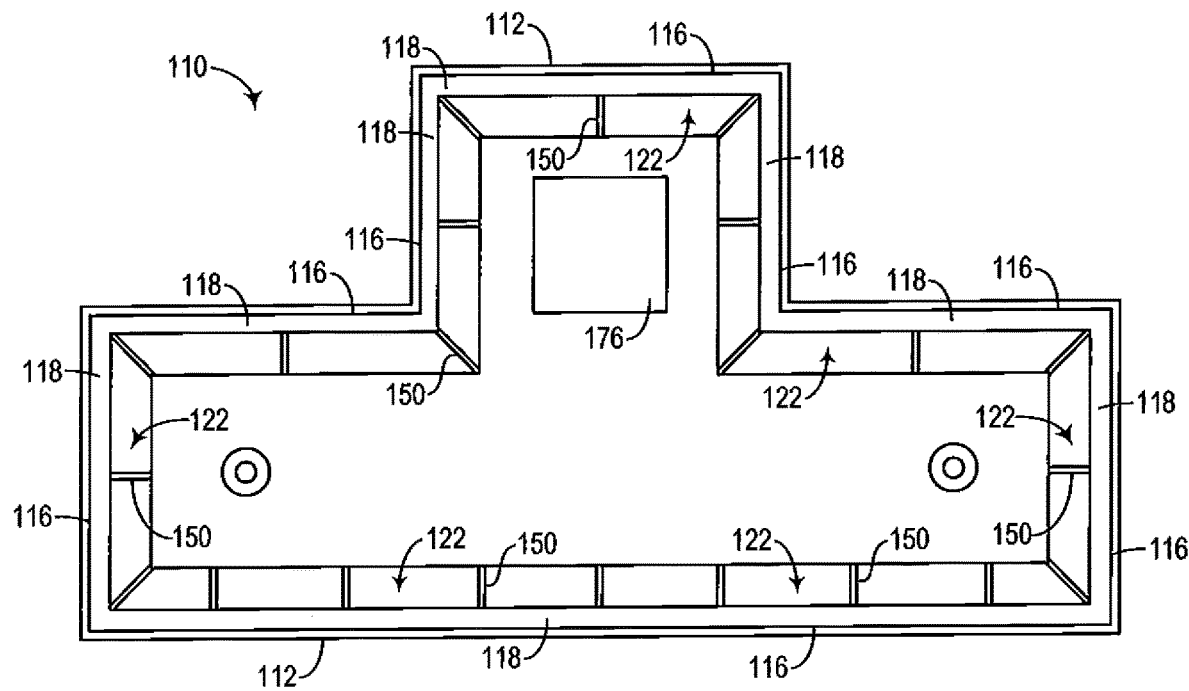
FIG. 13 is a plan (top) view, not to scale, of a T-shaped tundish comprising a refractory lining structure comprising elongated expansion joints.

For example, as shown in FIG. 13, the refractory lining structure, as described above, can be used in a T-shaped tundish 110 having eight sidewalls 116. The refractory lining structure 118 can be located on the outer shell 112 of the tundish 110 at the sidewalls 116. Substantially vertically extending, elongated expansion joints 150 are formed in the first surfaces 122 of the first layers, and are also formed at the intersections of the eight sidewalls 116. Although not shown, the refractory lining structure 118 can be omitted from some of the sidewalls 116, for example, the sidewalls 116 adjacent to an impact pad 176, and/or the elongated expansion joints can be omitted from some or all of the intersections of the eight sidewalls.

Figure 14:
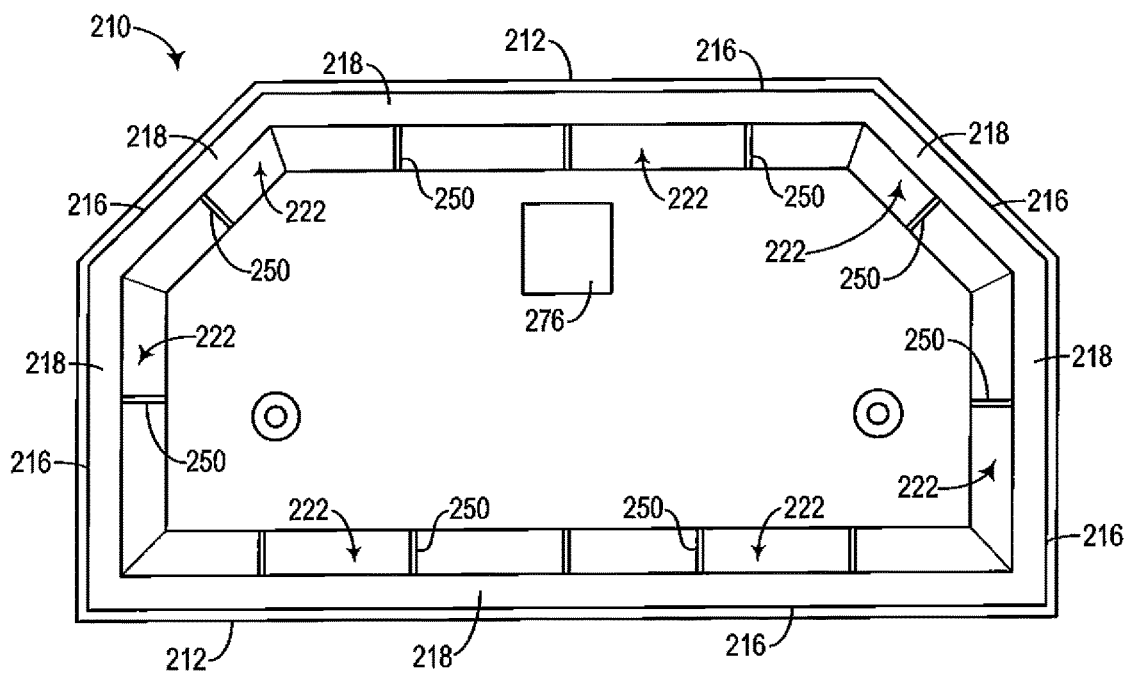
FIG. 14 is a plan (top) view, not to scale, of a delta-type tundish comprising a refractory lining structure comprising elongated expansion joints.

FIG. 14 shows a delta-type tundish 210 having six sidewalls 216. A refractory lining structure 218 can be located on the outer shell 212 of the tundish 210 at the sidewalls 216. Substantially vertically extending, elongated expansion joints 250 are formed in the first surfaces 222 of the first layers (and also optionally can be formed at the intersections of one or more of the six sidewalls 216, not shown). Although not shown, the refractory lining structure 218 can be omitted from some of the sidewalls 216, for example, the sidewalls 216 adjacent to an impact pad 276.

The elongated expansion joints shown in the drawings described above are illustrated as uniform in orientation in each metallurgical vessel, and having uniform dimensions, and shape (i.e., elongated contour and transverse (cross-sectional) shape). It is understood, however, that in any given metallurgical vessel comprising the refractory lining structure described above, the shape, dimensions, orientation, number, and spacing of the elongated expansion joints can vary from joint-to-joint. For example, referring to FIGS. 15A and 15B, a tundish 310 comprises a shell 312 and a refractory lining structure 318. The tundish 310 comprises a floor portion 314 and sidewall portions 316. The refractory lining structure 318 comprises a first layer 320, a second layer 330 underlying at least a portion of the first layer 320, and a third layer 340 underlying at least a portion of the second layer 330. The first layer 320, second layer 330, and third layer 340 each independently comprise a refractory material, as described above. It is also noted that the second layer 330 can be omitted and the first layer 320 positioned directly on the third layer 340, in which case the refractory lining structure 318 comprises a two-layer structure comprising only first and second layers.

Figure 15A:
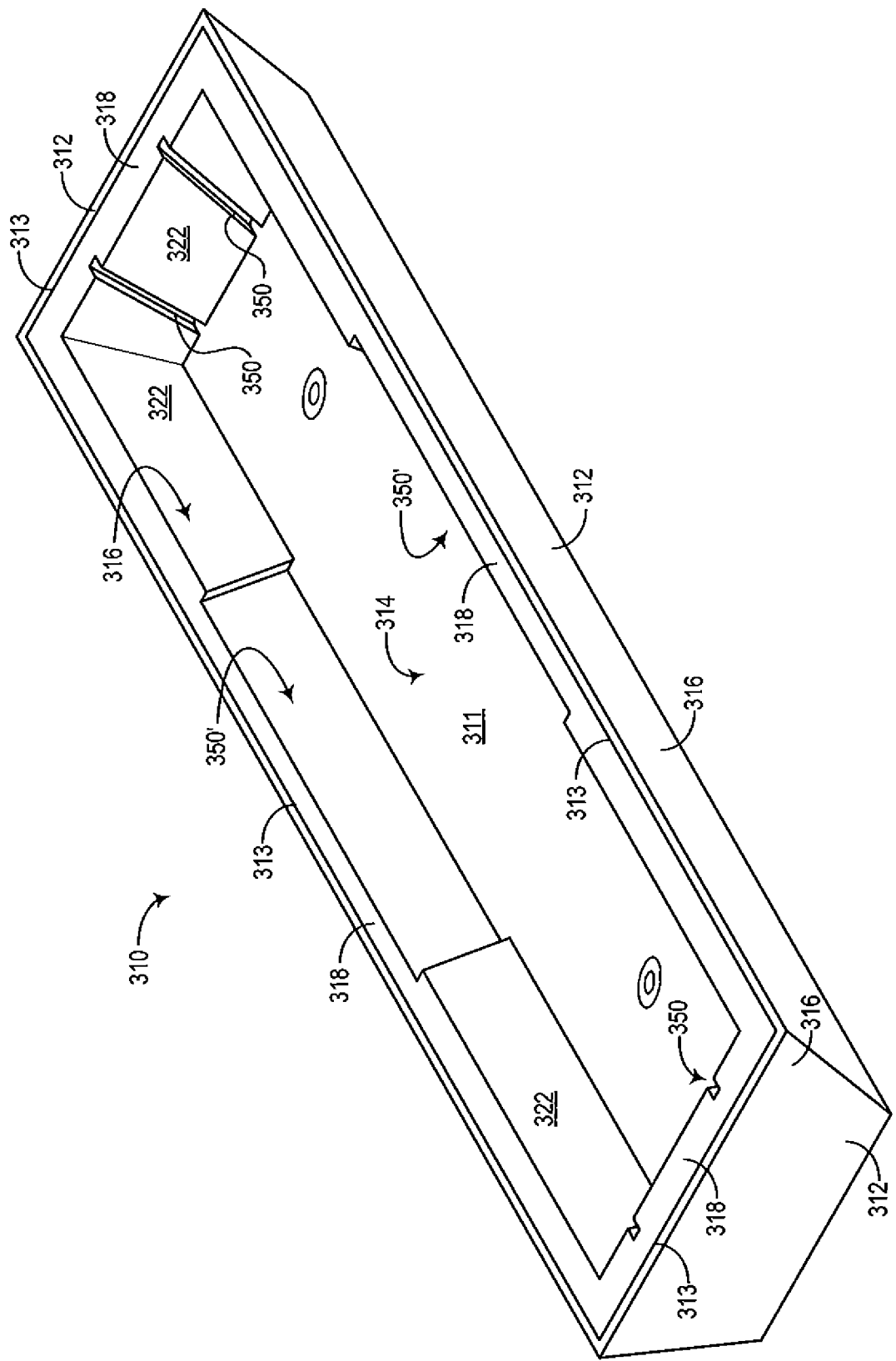
Figure 15B:
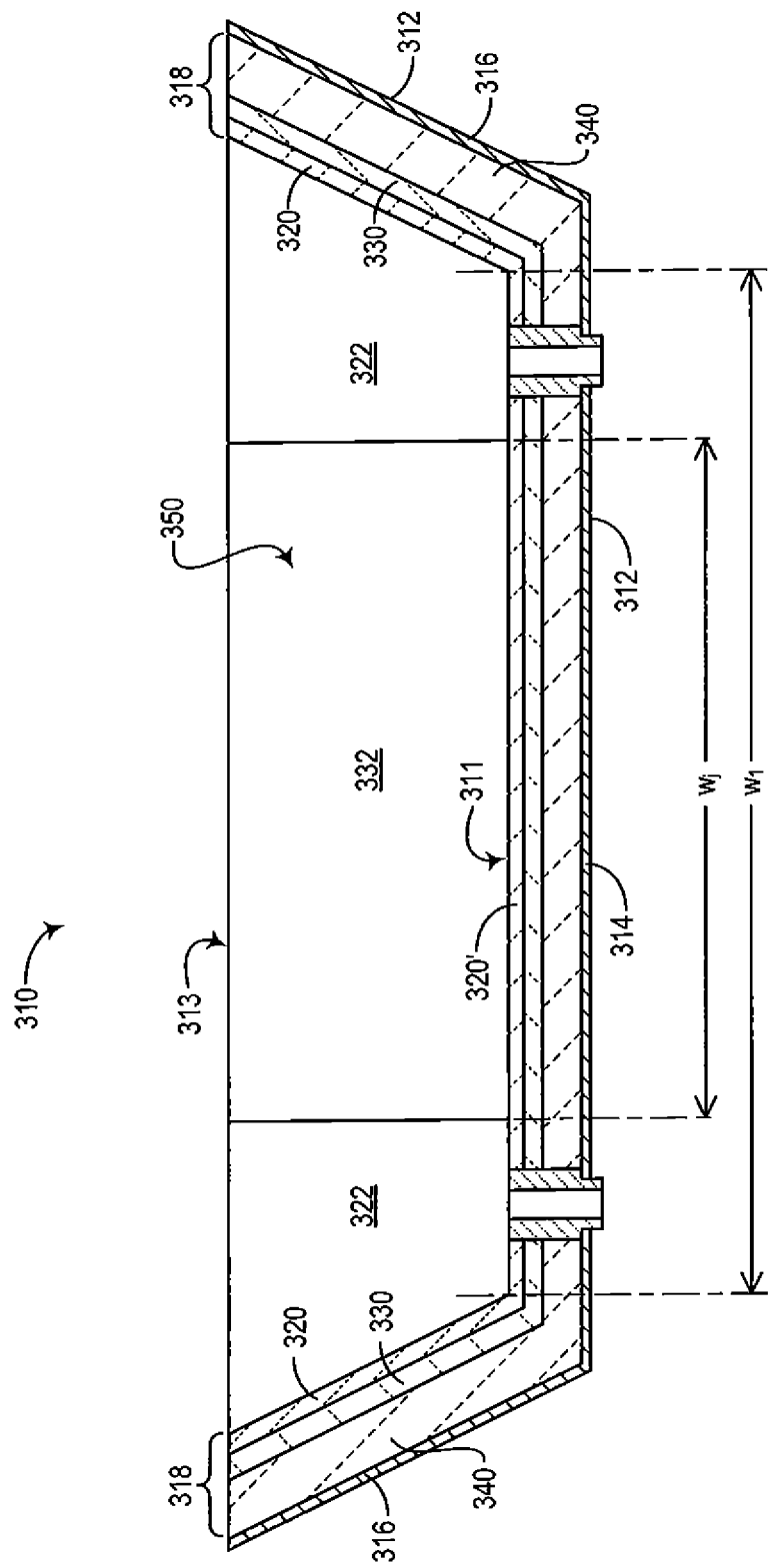

Still referring to FIGS. 15A and 15B, the refractory lining structure 318 further comprises elongated expansion joints 350 and 350' formed in the first surface 322 of the first layer 320, and extending through the first surface 322 of the first layer 320 in a substantially vertical direction away from the floor surface 311 of the tundish 310 toward the rim 313 of the tundish 310. The floor surface 311 corresponds to the molten metal-contacting surface of a working lining 320' located on the floor 314 of the tundish 310. The elongated expansion joints 350 and 350' extend the entire height of the first layer 320 on the sidewall 316 of the tundish 310. It is understood, however, that the elongated expansion joints 350 and 350' can extend less than the entire height of the first layer 320, as described above. The elongated expansion joints 350' located on the long sidewalls of the tundish 310 have greater horizontal widths than the elongated expansion joints 350 located on the short sidewalls of the tundish 310.

The depth and width dimensions, and the cross-sectional shape, of any given elongated expansion joint can vary from point-to-point along the length of the elongated expansion joint. Additionally, the thicknesses of the constituent layers of the refractory lining structure can vary from location-to-location within a given metallurgical vessel. For example, the first layer (working lining) can be thinner above the slag line than below the slag line in a tundish comprising the refractory lining structure. Alternatively or in addition, the first layer can comprise a region localized around the slag line that is thicker than the portions of the first layer above and below the slag line. Likewise, in some implementations, the second layer and/or the first layer (working lining) can be omitted from portions of the sidewalls of a tundish (e.g., above the slag line).

Although the refractory lining structure is described above in tundishes for use in steel continuous casting processes, it is understood that the refractory lining structure can be used in other metallurgical vessels for both ferrous and nonferrous applications, such as, for example, ladles. Likewise, while the refractory lining structure is described above in connection with drawings illustrating two-strand tundishes, it is understood that the refractory lining structure can be used in single-strand tundishes or multiple-strand tundishes having two or more well blocks per tundish (e.g., six-strand tundishes). Additionally, for ease of illustration, the tundishes shown in the drawings described above omit tundish furniture and other tundish components (e.g., dams, weirs, baffles, overflow spouts, stopper rods, slide gates, and the like). It is understood, however, that tundishes comprising the refractory lining structure described above can also comprise tundish furniture, other tundish components, and have non-planar and/or discontinuous floor surfaces.

EXAMPLES

Example 1

A tundish configured for the continuous casting of steel, and having a pre-installed refractory safety lining (third layer), was sprayed with BASILITE® 302 (a magnesite-olivine refractory spray coating, having a minimum MgO content of 50%, available from Vesuvius USA Corporation). The BASILITE® 302 layer was sprayed 1-to-1.5 inches thick on the floor and sidewalls of the tundish (about 2-inches thick on the slag line), thereby forming a 1-to-2-inches-thick second layer.

The applied BASILITE® 302 layer was dried out by first heating the layer at 600° F. for 0.5 hours, and then heating the layer at 1000° F. for 3 hours. The tundish was cooled to below 110° F., and a high alumina working lining was gunned over the BASILITE® 302 layer, thereby forming a first layer. Before the high alumina working lining was gunned over the BASILITE® 302 layer, sacrificial inserts/spacers made of plywood panels (60-inches×1.75-inches×0.375-inches) were positioned on the BASILITE® 302 layer on one of the four tundish sidewalls in a substantially vertical orientation every 15 inches along the horizontal width of the BASILITE® 302 layer. The plywood inserts/spacers were positioned with a 60-inches×0.375-inch face in contact with the BASILITE® 302 layer, and the 60-inches×1.75-inches faces were oriented substantially perpendicular to the surface of the BASILITE® 302 layer. Additionally, before the high alumina working lining was gunned, the BASILITE® 302 layer was sprayed with water to moisten the surface of the BASILITE® 302 layer.

After the high alumina working lining was gunned over the BASILITE® 302 layer and the plywood inserts/spacers, any residual refractory material was cleaned from the exposed surfaces of the plywood inserts/spacers (i.e., the surfaces that were not embedded in the applied layer of high alumina working lining) to ensure that the plywood inserts/spacers burned-out during the drying of the high alumina working lining. Additionally, on the three tundish sidewalls without plywood inserts/spacers, elongated expansion joints having a 0.25 inch (0.64 cm) horizontal width were cut into the applied layer of high alumina working lining using a saw at every 15 inches (38 cm) along the horizontal width of the layer. The cut elongated expansion joints were oriented substantially vertically through the surface of the applied first layer. The applied layer of high alumina working lining was dried out by heating the layer in the following sequence: 1 hour at 350° F. (180° C.)→1 hour at 500° F. (260° C.)→1 hour at 700° F. (370° C.)→2 hours at 950° F. (510° C.). Thermocouples positioned between the first layer and the second layer indicated that the interface temperature gradually increased to a peak temperature of 700° F. (370° C.) during the dry-out sequence.

The plywood inserts/spacers were completely burned out during the dry-out sequence, forming 0.375-inch (0.95 cm) wide elongated expansion joints that extended substantially vertically through the surface of the first layer. The previously cut 0.25-inch (0.64 cm) wide elongated expansion joints were re-cut to a 0.375-inch (0.95 cm) width. The elongated expansion joints formed by the burned-out plywood inserts/spacers were also re-cut with a 0.375-inch (0.95 cm) wide saw to ensure that the depth of all the elongated expansion joints extended through the entire thickness of the first layer. A 0.375-inch (0.95 cm) wide horizontal expansion joint was also cut around the perimeter of the tundish through the surface of the first layer on all four of the tundish sidewalls at approximately mid-height on the sidewalls.

The tundish was subjected to a 2000° F. (1100° C.) preheating operation for approximately 14 hours, after which the first layer exhibited minimal observable cracking and no observable delamination or spalling. The pre-heated tundish was used in a steel continuous casting campaign, after which the tundish was cooled and the residual steel in the tundish solidified to form a skull. The entire first layer remained adhered to the tundish sidewall during the continuous casting campaign. The cooled tundish was inverted and the skull fell out under the influence of gravity. The third layer (safety lining) was not damaged, which indicated that the elongated expansion joints did not compromise the shielding and insulating effectiveness of the first and second layers.

ASPECTS OF THE INVENTION

Various aspects of the invention include, but are not limited to, the following numbered clauses.
1. A refractory lining structure for a metallurgical vessel comprising:
a first layer having a first surface facing away from a sidewall of a metallurgical vessel and a second surface located opposite the first surface and facing toward the sidewall of the metallurgical vessel, the first layer comprising a first refractory material;
a second layer underlying at least a portion of the first layer, the second layer having a first surface facing away from the sidewall of the metallurgical vessel and a second surface located opposite the first surface and facing toward the sidewall of the metallurgical vessel, the second layer comprising a second refractory material, wherein the second surface of the first layer contacts the first surface of the second layer; and
at least one elongated expansion joint formed in the first surface of the first layer and extending through the first surface of the first layer in a substantially vertical direction.
2. The refractory lining structure of clause 1, wherein the first refractory material and the second refractory material are independently selected from the group consisting of aluminum oxide refractory materials, magnesium oxide refractory materials, chrome refractory materials, and zirconium oxide refractory materials, and combinations of any thereof.
3. The refractory lining structure of clause 1 or clause 2, wherein the first refractory material comprises an aluminum oxide refractory material, and wherein the second refractory material comprises an aluminum oxide refractory material, a magnesium oxide refractory material, a chrome refractory material, a zirconium oxide refractory materials, or a combination of any thereof.

4. The refractory lining structure of any one of clauses 1-3, wherein the first refractory material comprises an aluminum oxide refractory material, and wherein the second refractory material comprises a magnesium oxide refractory material.

5. The refractory lining structure of any one of clauses 1-3, wherein the first refractory material and the second refractory material both comprise an aluminum oxide refractory material.

6. The refractory lining of any one of clauses 1-3, wherein the first refractory material comprises an aluminum oxide refractory material, and wherein the second refractory material comprises an olivine/dunite refractory material.

7. The refractory lining on any one of clauses 1-3, wherein the first refractory material comprises an aluminum oxide refractory material, and wherein the second refractory material comprises a dolomite refractory material.

8. The refractory lining structure of any one of clauses 1-7, wherein the at least one elongated expansion joint comprises an elongated contour selected from the group consisting of vertical lines, diagonal lines, polylines, and curves, and combinations of any thereof.

9. The refractory lining structure of any one of clauses 1-8, wherein the at least one elongated expansion joint has an aspect ratio of greater than 0.05.

10. The refractory lining structure of any one of clauses 1-9, wherein the at least one elongated expansion joint has an aspect ratio of at least 0.1.

11. The refractory lining structure of any one of clauses 1-10, wherein the at least one elongated expansion joint has an aspect ratio of at least 50.

12. The refractory lining structure of any one of clauses 1-11, wherein the at least one elongated expansion joint has an aspect ratio of at least 75.

13. The refractory lining structure of any one of clauses 1-12, wherein the at least one elongated expansion joint has an aspect ratio of at least 100.

14. The refractory lining structure of any one of clauses 1-13, wherein the at least one elongated expansion joint is characterized by a width ratio of at least 0.005.

15. The refractory lining structure of any one of clauses 1-14, wherein the at least one elongated expansion joint is characterized by a width ratio of at least 0.010.

16. The refractory lining structure of any one of clauses 1-15, wherein the at least one elongated expansion joint is characterized by a width ratio of at least 0.015.

17. The refractory lining structure of any one of clauses 1-16, wherein the at least one elongated expansion joint is characterized by a width ratio of at least 0.025.

18. The refractory lining structure of any one of clauses 1-17, wherein the width dimension of the at least one elongated expansion joint ranges from 1 millimeter (0.04 inch) to 100 millimeters (4 inches).

19. The refractory lining structure of any one of clauses 1-18, wherein the width dimension of the at least one elongated expansion joint ranges from 5 millimeters (0.20 inch) to 25 millimeters (1 inch).

20. The refractory lining structure of any one of clauses 1-19, wherein the at least one elongated expansion joint has a depth dimension extending from the first surface of the first layer toward the second surface of the first layer, and wherein the depth dimension is at least 50% of the thickness of the first layer.

21. The refractory lining structure of any one of clauses 1-20, wherein the depth dimension of the at least one elongated expansion joint is 100% of the thickness of the first layer, wherein the depth dimension of the at least one elongated expansion joint extends from the first surface of the first layer to the second surface of the first layer, and wherein the first surface of the second layer is partially exposed by the at least one elongated expansion joint.

22. The refractory lining structure of any one of clauses 1-21, wherein the thickness of the first layer and the thickness of the second layer, independently, range from 1 millimeter (0.04 inch) to 65 millimeters (2.6 inches).

23. The refractory lining structure of any one of clauses 1-22, wherein the thickness of the first layer and the thickness of the second layer, independently, range from 25 millimeters (1 inch) to 50 millimeters (2 inches).

24. The refractory lining structure of any one of clauses 1-23, wherein the at least one elongated expansion joint has a vertical height dimension that is at least 75% of the vertical height dimension of the first surface of the first layer.

25. The refractory lining structure of any one of clauses 1-24, wherein the at least one elongated expansion joint has a vertical height dimension that is at least 100% of the vertical height dimension of the first surface of the first layer.

26. The refractory lining structure of any one of clauses 1-25, comprising a plurality of elongated expansion joints formed in the first surface of the first layer, wherein each of the plurality of elongated expansion joints extends through the first surface of the first layer in a substantially vertical direction, and wherein the plurality of elongated expansion joints are spaced apart from each other in a horizontal direction by a minimum of 2.54 centimeters (1 inch).

27. The refractory lining structure of any one of clauses 1-26, further comprising an elongated expansion joint formed in the first surface of the first layer and extending through the first surface of the first layer in a substantially horizontal direction.

28. The refractory lining structure of any one of clauses 1-27, further comprising a third layer underlying at least a portion of the second layer, the third layer having a first surface facing away from the sidewall of the metallurgical vessel and a second surface located opposite the first surface and facing toward and contacting the sidewall of the metallurgical vessel, the third layer comprising a third refractory material, wherein the second surface of the second layer contacts the first surface of the third layer.

29. A metallurgical vessel comprising:
    a floor and a sidewall extending from the floor in a substantially vertical direction; and
    the refractory lining structure of any one of clauses 1-28 located on at least a portion of the sidewall of the metallurgical vessel.

30. The metallurgical vessel of clause 29, wherein the metallurgical vessel comprises a tundish configured for use in a continuous casting operation, wherein the tundish comprises at least four intersecting sidewalls, wherein the refractory lining structure is located on at least a portion of the at least four sidewalls, and wherein at least one elongated expansion joint is formed in the first surface of the first layer on each of the at least four sidewalls, and wherein the elongated expansion joints extend through the first surfaces of the first layers in a substantially vertical direction.

31. A method of producing a refractory lining structure of any of clauses 1-28 in a refractory vessel, comprising
    a) Providing a metallurgical vessel having lateral and bottom walls having a refractory safety lining;

b) Applying a second refractory layer comprising a second refractory material over the refractory safety lining;

c) Applying a first refractory layer comprising a first refractory material over the second refractory layer, wherein the first refractory layer has a first surface facing away from a sidewall of the metallurgical vessel; and d) Forming at least one elongated expansion joint in the first surface of the first layer and extending through the first surface of the first layer in a substantially vertical direction.

32. The method of clause 32, wherein the first refractory material comprises at least 50% alumina by mass.

Various features and characteristics are described in this specification and illustrated in the drawings to provide an overall understanding of the invention. It is understood that the various features and characteristics described in this specification and illustrated in the drawings can be combined in any operable manner regardless of whether such features and characteristics are expressly described or illustrated in combination in this specification. The Inventors and the Applicant expressly intend such combinations of features and characteristics to be included within the scope of this specification, and further intend the claiming of such combinations of features and characteristics to not add new subject matter to the application. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new subject matter to the specification or claims, and will comply with written description, sufficiency of description, and added matter requirements (e.g., 35 U.S.C. § 112(a) and Article 123(2) EPC). The invention can comprise, consist of, or consist essentially of the various features and characteristics described in this specification.

Also, any numerical range recited in this specification includes the recited endpoints and describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements (e.g., 35 U.S.C. § 112(a) and Article 123(2) EPC).

The grammatical articles "one", "a", "an", and "the", as used in this specification, are intended to include "at least one" or "one or more", unless otherwise indicated or required by context. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the invention. Further, the use of a singular noun includes the plural, and the use of a plural noun includes the singular, unless the context of the usage requires otherwise.

TABLE OF ELEMENTS

10. Tundish
11. Tundish floor surface
12. Tundish shell
13. Tundish rim
14. Tundish floor
16. Sidewall portions of tundish
18. Refractory lining structure
20. First layer of refractory lining structure
20'. Metal-contacting surface of a working lining
22. First surface of the first layer
23. Recessed surface of the first layer
24. Second surface of the first layer
30. Second layer of refractory lining structure
32. First surface of the second layer
34. Second surface of the second layer
40. Third layer of refractory lining structure
42. First surface of the third layer
44. Second surface of the third layer
50. Elongated expansion joint
51. Portions of expansion joints extending below the floor surface
55. Insert/spacer
57. Substantially vertical axis in the plane of the first surface of the first layer
60. Molten steel
62. Ladle shroud
64. Indication of flow of molten steel
65. Slag line
66. Ladle blocks
68. Openings in ladle blocks
70. Horizontally extended, elongated expansion joint
110. T-shaped tundish
112. Outer shell of tundish
116. Sidewalls
118. Refractory lining structure
122. First surfaces of the first layers
150. Vertically extending, elongated expansion joints
176. Impact pad
210. Delta-type tundish
212. Outer shell of tundish
216. Sidewalls
218. Refractory lining structure
222. First surfaces of the first layer
250. Substantially vertically extending, elongated expansion joints
276. Impact pad
310. Tundish
311. Floor surface of the tundish

What is claimed is:

1. A refractory lining structure for a metallurgical vessel comprising:

a monolithic first layer having a first surface facing away from a sidewall of a metallurgical vessel and a second surface located opposite the first surface and facing toward the sidewall of the metallurgical vessel, the first layer comprising a first refractory material, wherein the monolithic first layer comprises a thickness;

a second layer underlying at least a portion of the first layer, the second layer having a first surface facing away from the sidewall of the metallurgical vessel and a second surface located opposite the first surface and facing toward the sidewall of the metallurgical vessel, the second layer comprising a second refractory material, wherein the second surface of the first layer contacts the first surface of the second layer; and at least one elongated expansion joint formed in the first surface of the first layer and extending through the first surface of the first layer in a substantially vertical direction, wherein the at least one elongated expansion joint comprises a width dimension, a sum of horizontal width dimensions, a depth dimension and a vertical height dimension, wherein the sum of the horizontal width dimensions of the at least one elongated expansion joint is characterized by a width ratio of at least 0.010, wherein the width ratio≡

$$\frac{\sum_{j=1}^{n} w_j}{w_1},$$

wherein the first surface of the monolithic first layer contains "n" number of the at least one elongated expansion joints, each of horizontal width $w_j$, wherein $w_1$ is a total horizontal width dimension of the first surface of the monolithic first layer on the sidewall.

2. The refractory lining structure of claim 1, wherein the first refractory material and the second refractory material are independently selected from the group consisting of aluminum oxide refractory materials, magnesium oxide refractory materials, chrome refractory materials, zirconium oxide refractory materials, and combinations of any thereof.

3. The refractory lining structure of claim 1, wherein the at least one elongated expansion joint comprises an elongated contour selected from the group consisting of vertical lines, diagonal lines, polylines, curves, and combinations of any thereof.

4. The refractory lining structure of claim 1, wherein the at least one elongated expansion joint has an aspect ratio of at least 0.1.

5. The refractory lining structure of claim 1, wherein the at least one elongated expansion joint has an aspect ratio of at least 50.

6. The refractory lining structure of claim 1, wherein the width dimension of the at least one elongated expansion joint ranges from 1 millimeter (0.04 inch) to 100 millimeters (4 inches).

7. The refractory lining structure of claim 1, wherein the width dimension of the at least one elongated expansion joint ranges from 5 millimeters (0.20 inch) to 25 millimeters (1 inch).

8. The refractory lining structure of claim 1, wherein the at least one elongated expansion joint has a depth dimension extending from the first surface of the first layer toward the second surface of the first layer, and wherein the depth dimension is at least 50% of the thickness of the first layer.

9. The refractory lining structure of claim 1, wherein the depth dimension of the at least one elongated expansion joint is 100% of the thickness of the first layer, wherein the depth dimension of the at least one elongated expansion joint extends from the first surface of the first layer to the second surface of the first layer, and wherein the first surface of the second layer is partially exposed by the at least one elongated expansion joint.

10. The refractory lining structure of claim 1, wherein the thickness of the first layer and the thickness of the second layer, independently, range from 1 millimeter (0.04 inch) to 65 millimeters (2.6 inches).

11. The refractory lining structure of claim 1, wherein the thickness of the first layer and the thickness of the second layer, independently, range from 25 millimeters (1 inch) to 50 millimeters (2 inches).

12. The refractory lining structure of claim 1, wherein the at least one elongated expansion joint has a vertical height dimension that is at least 75% of the vertical height dimension of the first surface of the first layer.

13. The refractory lining structure of claim 1, wherein the at least one elongated expansion joint has a vertical height dimension that is at least 100% of the vertical height dimension of the first surface of the first layer.

14. The refractory lining structure of claim 1, comprising a plurality of elongated expansion joints formed in the first surface of the first layer, wherein each of the plurality of elongated expansion joints extends through the first surface of the first layer in a substantially vertical direction, and wherein the plurality of elongated expansion joints are spaced apart from each other in a horizontal direction by a minimum of 2.54 centimeters (1 inch).

15. The refractory lining structure of claim 1, further comprising an elongated expansion joint formed in the first surface of the first layer and extending through the first surface of the first layer in a substantially horizontal direction.

16. The refractory lining structure of claim 1, further comprising a third layer underlying at least a portion of the second layer, the third layer having a first surface facing away from the sidewall of the metallurgical vessel and a second surface located opposite the first surface and facing toward and contacting the sidewall of the metallurgical vessel, the third layer comprising a third refractory material, wherein the second surface of the second layer contacts the first surface of the third layer.

17. A metallurgical vessel comprising:
a floor and a sidewall extending from the floor in a substantially vertical direction; and
the refractory lining structure of claim 1 located on at least a portion of the sidewall of the metallurgical vessel.

18. The metallurgical vessel of claim 17, wherein the metallurgical vessel comprises a tundish configured for use in a continuous casting operation, wherein the tundish comprises at least four intersecting sidewalls, wherein the refractory lining structure is located on at least a portion of the at least four sidewalls, and wherein at least one elongated expansion joint is formed in the first surface of the first layer on each of the at least four sidewalls, and wherein the elongated expansion joints extend through the first surfaces of the first layers in a substantially vertical direction.

19. The refractory lining structure of claim 1, wherein the at least one elongated expansion joint is formed: by cutting the at least one elongated expansion joint into the first layer; or by positioning an insert or a spacer on the first surface of the second layer, and applying the first layer onto the first surface of the second layer and around the insert or the spacer.

\* \* \* \* \*